(12) United States Patent
Ikeda et al.

(10) Patent No.: US 6,625,115 B1
(45) Date of Patent: Sep. 23, 2003

(54) SELF-HEALING NETWORK, METHOD FOR TRANSMISSION LINE SWITCHING THEREOF, AND TRANSMISSION EQUIPMENT THEREOF

(75) Inventors: Hiroki Ikeda, Kokubunji (JP); Toshiki Sugawara, Dallas, TX (US); Yukio Nakano, Richardson, TX (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/667,890

(22) Filed: Sep. 22, 2000

Related U.S. Application Data

(63) Continuation of application No. 08/837,734, filed on Apr. 22, 1997, now Pat. No. 6,144,633.

(30) Foreign Application Priority Data

Apr. 23, 1996 (JP) ............................................. 8-100888

(51) Int. Cl.$^7$ .............................................. G01R 31/08
(52) U.S. Cl. ...................................... 370/217; 370/351
(58) Field of Search ................................ 370/216, 217, 370/222, 223, 224, 221, 218, 219, 220, 227, 248, 249, 256, 351

(56) References Cited

U.S. PATENT DOCUMENTS

| | | | |
|---|---|---|---|
| 4,646,286 A | 2/1987 | Reid et al. ..................... | 370/16 |
| 4,967,405 A | 10/1990 | Upp et al. .................. | 359/135 |

(List continued on next page.)

FOREIGN PATENT DOCUMENTS

| | | |
|---|---|---|
| EP | 0645905 | 3/1995 |
| JP | 7202861 | 8/1995 |
| JP | 7226729 | 8/1995 |
| JP | 7264156 | 10/1995 |
| JP | 0331228 | 10/2002 |

OTHER PUBLICATIONS

"Sonet Biderectional Line–Switched Ring Equipment Generic Criteria", Bellcore Genetic Requirements GR–1230–Core, Issue 1, Dec. 1993.
Ellson, John, "Nested Protection Switching", pp 1–19At&T Network Systems, Jul. 18, 1990.
Wu, Tsong–Ho, "Fiber Network Service Survivability" pp. 109–121, Artech House, Inc. 1992.
European Search Report dated Feb. 7, 2002.

*Primary Examiner*—Wellington Chin
*Assistant Examiner*—Brenda Pham
(74) *Attorney, Agent, or Firm*—Sofer & Haroun, LLP

(57) ABSTRACT

The present invention provides a network in which the installation of working lines may be enabled based on the required traffic and the high speed switching of the transmission lines may be realized, as well as a transmission equipment used for that network and a method of control thereof.

The transmission equipment comprises an APS byte transmitter/receiver for exchanging information on failures with adjacent transmission equipment through a protection line, a monitor for monitoring anomalies on a plurality of the working lines, a Network Table for storing data indicating network structure, a processing unit for determining working lines to be switched based on the data stored in the Network Table and for processing APS bytes.

APS bytes are allocated with the working line number, its priority, and the source node number of switching signal. In addition a Network Table is provided to each node for storing connecting state of the network and information on failures, thereby the destination node may be identified.

When a failure occurs, the best optimal line switching will be performed by exchanging information on failures by means of the APS bytes.

5 Claims, 26 Drawing Sheets

U.S. PATENT DOCUMENTS

| | | |
|---|---|---|
| 5,113,395 A | 5/1992 | Murakami et al. ........... 370/505 |
| 5,307,353 A | 4/1994 | Yamashita et al. ..... 395/182.02 |
| 5,442,620 A | 8/1995 | Kremer ........................ 370/16 |
| 5,442,623 A | 8/1995 | Wu ............................ 370/224 |
| 5,535,248 A * | 7/1996 | Kurokami ................... 375/324 |
| 5,550,805 A | 8/1996 | Takatori et al. .............. 370/222 |
| 5,590,119 A | 12/1996 | Moran et al. ................ 370/225 |
| 5,815,490 A | 9/1998 | Lu .............................. 370/223 |
| 5,875,172 A * | 2/1999 | Tabata ........................ 370/228 |

* cited by examiner

FIG. 2
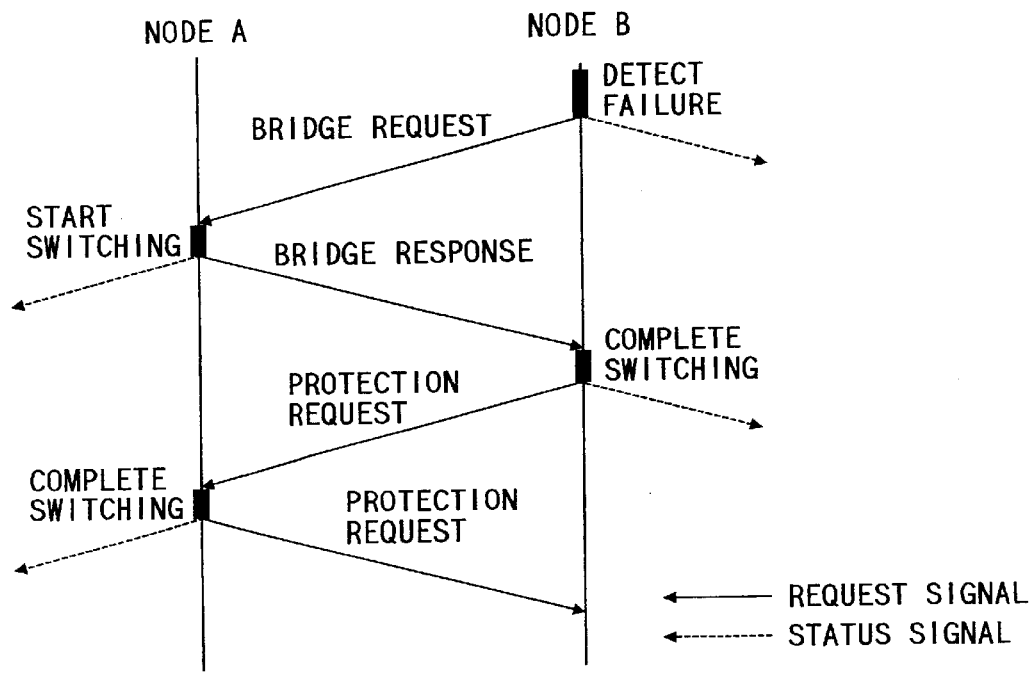
FIG. 3
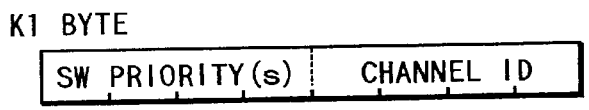
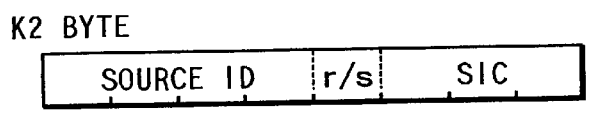
SW PRIORITY(s) : PRIORITY(s) FOR FAILURES
CHANNEL ID : CHANNEL NUMBER OF THE PRIORITY FOR FAILURES
(NORMALLY IT TEACHES PROTECTION CHANNEL)
SOURCE ID : SOURCE NODE ID
r/s SIGNAL : REQUEST SIGNAL/STATUS SIGNAL
SIC : STATUS INDICATION CODE

— WORKING LINE
----- PROTECTION LINE

— WORKING LINE
----- PROTECTION LINE

☐☐ : LTE
☐☐ : ADM

☐☐ : LTE
☐☐ : ADM

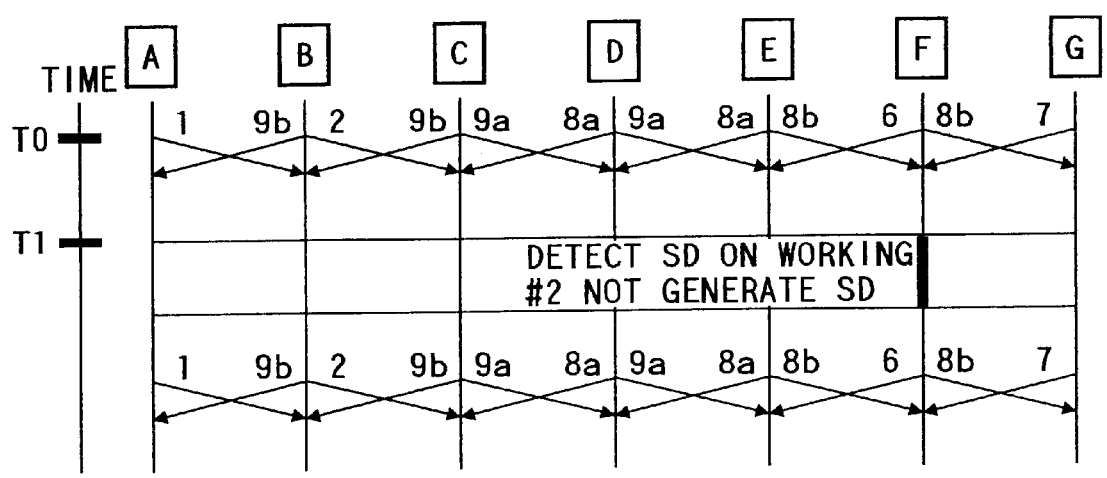

☐☐ : LTE
☐☐ : ADM
▨▨ : PROTECTED

☐☐ : LTE
☐☐ : ADM
▨▨ : PROTECTED

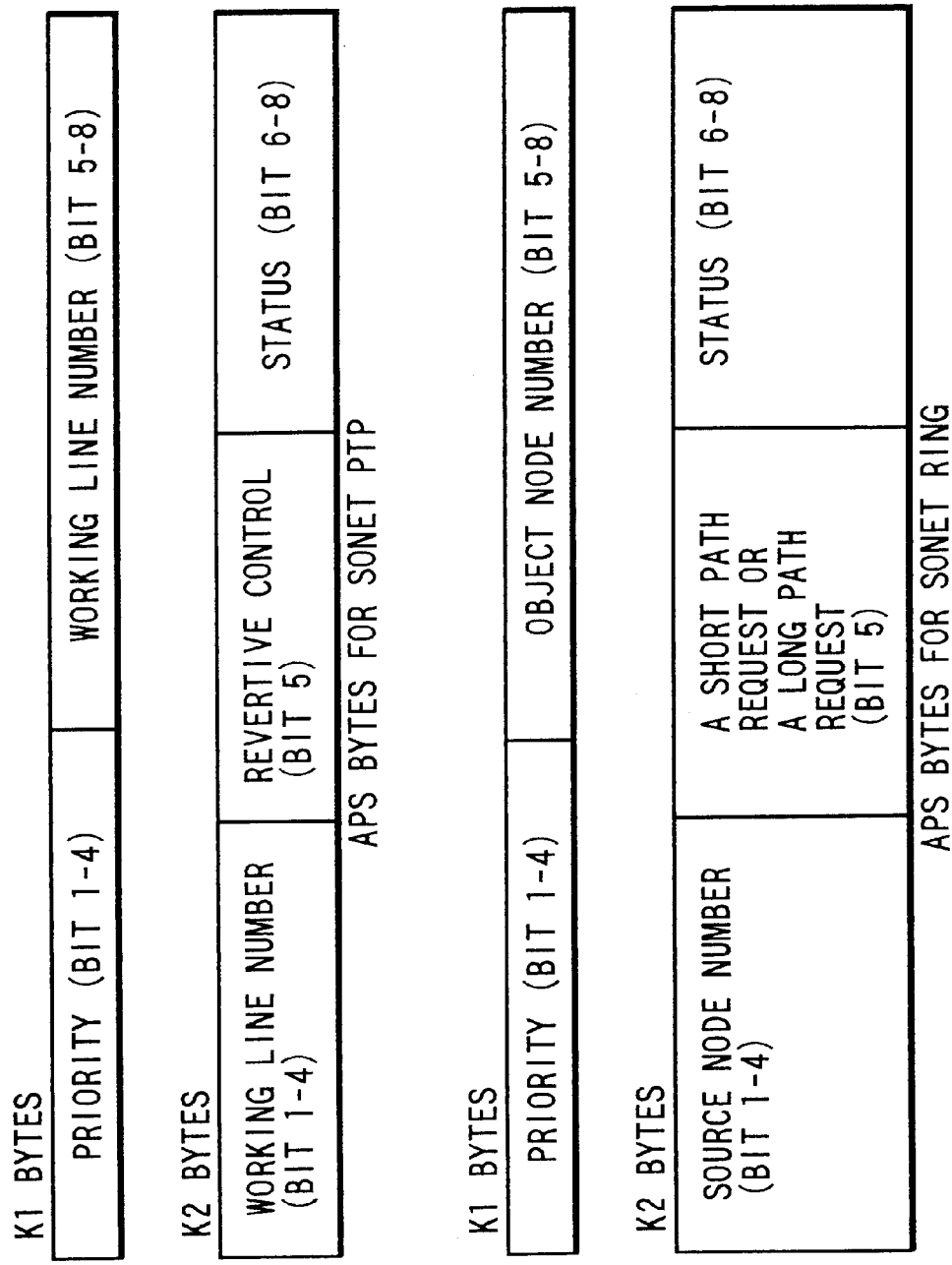

FIG. 32

PRIORITY (BIT 1-4)
1111 PROTECTION LINE FAILURE
1110 FORCED SWITCH
1101 FORCE SWITCH PROTECTING
      SIGNAL DEGRADATION
1100 SIGNAL FAILURE
1011 SIGNAL FAILURE PROTECTING
      SIGNAL DEGRADATION
1001 SIGNAL DEGRADE
1000 MANUAL SWITCH
0000 NORMAL

WORKING LINE NUMBER (BIT 5-8)
1111 WORKING LINE #15
 . . .
0001 WORKING LINE #1
0000 PROTECTION LINE #0

SOURCE NODE (BIT 1-4)
1111 NODE P
 . . .
0000 NODE A

BIT 5
1 REQUEST SIGNAL
0 STATUS SIGNAL

SWITCHING STATUS (BIT 6-8)
110 INFORMATION OF FAILURE
011 SWITCH AT TRANSMITTER
    AND RECEIVER SIDES
000 NORMAL STATUS

FIG. 33
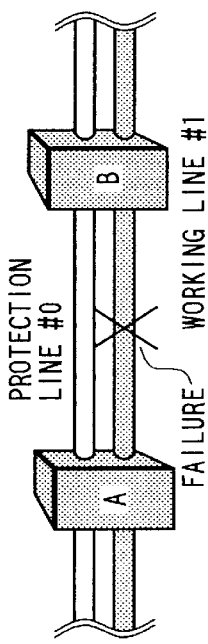
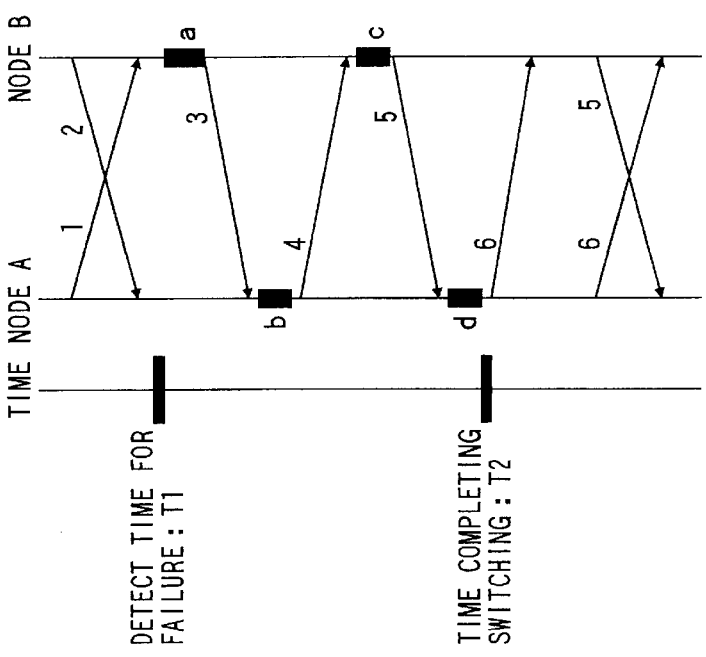

FIG. 34
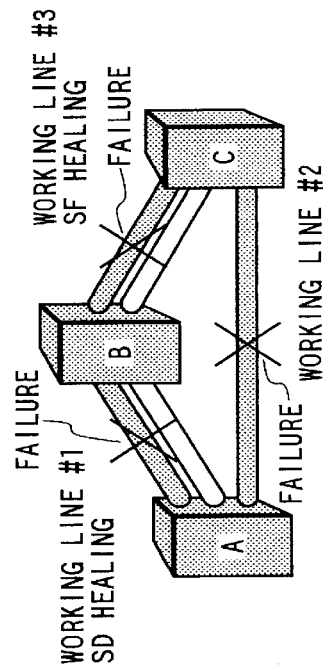
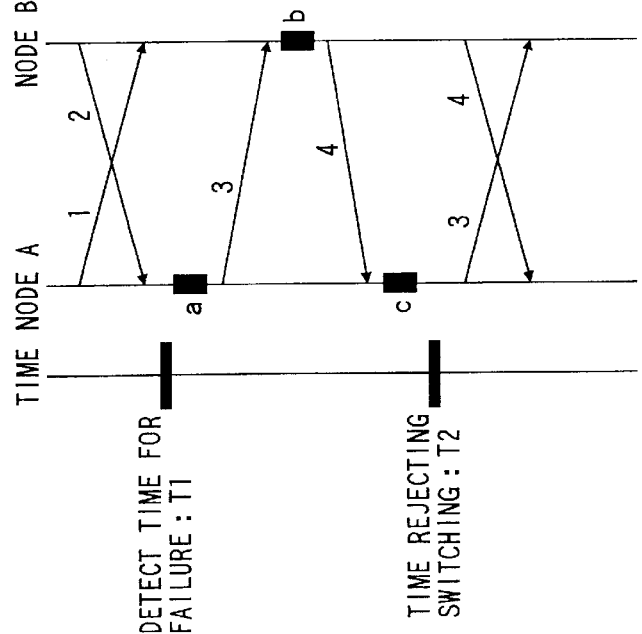

SELF-HEALING NETWORK, METHOD FOR TRANSMISSION LINE SWITCHING THEREOF, AND TRANSMISSION EQUIPMENT THEREOF

The present invention is a continuation application of application Ser. No. 08/837,734 filed Apr. 22, 1997 now U.S. Pat. No. 6,144,633.

BACKGROUND OF THE INVENTION

The present invention relates to a switching method of transmission lines in a transmission network. Specifically, the present invention relates to a method of transmission line switching, transmission equipment, and network architecture suitable to SONET (Synchronous Optical Network) or SDH (Synchronous Digital Hierarchy) network.

Recent years, there are proposed many transmission line switching methods to protect signals against line failure (for example, inadvent disconnection or degradation of line failure of repeaters) in order to improve the reliability of transmission services.

These methods comprise for example: (1) 1 to N type NPS (Nested Protection Switching) network in which a plurality of working lines and protection lines are installed in a same path, and line switching method thereof, (2) 4-Fiber BLSR (Bidirectional Line Switching Ring) and transmission line switching method thereof, in which a plurality of transmission equipment are connected by the working line and protection line in a ring form. Examples of the former method include ""Nested Protection Switching" T1X1.5/90-132,1992" and Fiber Network Service Survivability, and the examples of the latter include "Bellcore "SONET BLSR Genetic Criteria" GR-1230-CORE,1993".

FIG. 9 shows an example of N-type NPS network. In this figure, 101 through 104 designate transmission equipment. The network example of FIG. 9 is connected as follows: its working line 105 is terminated by the transmission equipment 101 and 102. A working line 106 is terminated, on the other hand, by the transmission equipment 102 and 103. These working lines 105 and 106 are connected by using an Add-Drop Multiplexing equipment in the transmission equipment 102. A working line 107 is terminated by the transmission equipment 102 and 104. And the working line 107 is routed by the transmission equipment 103.

On the other hand; the protection lines 109 through 111 are depicted in FIG. 9 by dotted lines. The protection lines 109 through 111 are all connected to every transmission equipment 101 through 104, being connected by using Add-Drop Multiplexing equipment 114 within respective transmission equipment. Each of transmission equipment has ability of switching between transmission lines, and therein the working lines and protection lines transmit signals bidirectionally.

One to N type NPS network as shown in FIG. 9 may select Add-Drop Multiplexing equipment or repeater for a transmission equipment when required for a working line. This allows the flexibility of the N-type network service to be improved. Also its economical efficiency may be improved, since N working lines share the protection line in this network. Furthermore, this network is predominant in the addition of working lines. For example, when traffics between the transmission equipment 101 and 103 are required to be newly added, it is possible to add working lines of the required capacity easily. Thus, as in the example of working line 108, the line addition may be realized by terminating by the transmission equipment 101 and 103, and by repeating by the transmission equipment 102.

At this point, how to switch when a failure occurs in such an architecture will be described with reference to FIG. 9. The switching method is dependent on following three factors: (1) the position in the transmission equipment at the point where the failure has been occurred; (2) the level of importance of the failure; and (3) the order of the occurrence of failures.

If the first failure of the importance level 3 has been occurred in the working line 105, the working line will be protected by using the protection line 109. In this case the larger the importance level, the faster the protection of the failure will be realized.

If the second failure of the importance level 1 has been occurred in the working line 106, the working line will be protected by using the protection line 110.

If the third failure of the importance level 2 has been occurred in the working line 108, the protection lines 109 and 110 will be required for the protection. However, in this case, the protection lines 109 and 110 are already in use. By comparing the importance level between failures in the protection lines, the importance level of the protection line 109 is three and that of the protection line 110 is one. As the importance level of the protection line 109 is higher than the importance level of failure of the working line 108, the working line 108 will not be protected. In this case the working line 106 will remain protected. Thus the transmission equipment which has detected the failure of the working line 108 should know the working line 108 is denied being protected.

If the fourth failure of the importance level 4 has been occurred in the working line 107, the protection lines 110 and 111 are required for the protection while the protection line 110 are already in use. When referring to the importance level of that protection line, the importance level of the protection line 110 is one, which importance level is lower than the importance level of the working line 107. Thus the protection line 110 will be used for the protection of the working line 107. At this time the fourth failure will be protected, whereas the second and third failures will not.

As described above, the switching decision and switching operation between transmission lines in an NPS network will be done in the transmission equipment which terminates the working line. This means that the transmission equipment should know the information on other transmission lines that the working line requests as a protection line simultaneously. Therefore, whether or not the switching operation is proper should be determined correctly based on the communication of switch control information among respective transmission equipment.

There are proposed such methods as follows, in which the switching operation is to be performed by exchanging the control information in the transmission equipment based on the overhead of SOMET/SDH. These include: (1) a method using Automatic Protection Switching bytes (APS bytes) and DCC bytes (e.g., ITU-T(International Telecommunication Union-Telecommunication Standardization Sector), T1X1.5/90-132,1990); and (2) a method using APS bytes and a timer (Tsong-Ho Wu,"Fiber Network Service Survivability",Aretec house,1992 ). In this context the APS bytes indicates the bytes defined in the SONET/SDH for the use of exchanging of control information for transmission line switching on the SOMET/SDH. APS bytes are comprised of so-called K1 byte and K2 byte. The use of APS bytes on a Point-to-Point basis may be found in the section 5 of "Bellcore GR-253-CORE," issue Dec. 1, 1993.

Now, SONET, SDH and a network of the present invention conduct digital transmission by using an overhead of transmission frames for digital transmission and by using performing frame phase alignment and stuff control by swapping pointers in the digital transmission, as known well.

The above described first switching method "T1X1.5/90-132" is a method for an appropriate switching of working lines on the basis of comparison of the importance level by transmitting the importance level of the working line using a plurality of DCC bytes.

The above described second switching method "Fiber Network Service Survivability" is a method as follows. The transmission equipment having detected a failure transmits K1 bytes of APS bytes to wait for the response with K2 bytes. The destination node transmits K2 bytes indicating the response when K1 bytes are received, on the assumption that a protection line has been allocated. The source node receiving the K2 bytes indicating this response starts the switching operation. If there exists a request of higher importance level on the route to the destination node, the K1 bytes will not be arrived at the destination node, so that the K2 bytes indicating the response will not be transmitted. Therefore, a timeout will occurr in the transmission equipment which has detected a failure, so that the switching operation will be determined not to be performed.

FIG. 10 illustrates 4-fiber BLSR, one of transmission methods. In FIG. 10, reference numerals 115 through 118 designate transmission equipment. The working lines 119 through 122 and protection lines 122 through 125 are connected in a ring form. Each of these transmission equipment has ability of switching transmission lines such,that these transmission equipment transmit bidirectionally signals on the working lines and the protection lines.

Now the basic operation of transmission line switching against failures of lines in this 4 fiber BLSR will be described below. In FIG. 10, when a failure occurs in a working line 122, signals will be protected by using protection line 126. Also, if there are failures on both of the working line 122 and the protection line 126, a detour route is used which is specific to the ring form. That means that in the transmission method of 4-Fiber BLSR signal protection may be achieved by using the protection lines 123 through 125. The protection method in the ring form is characterized in that two routes of clockwise and counter-clockwise directions may be selected. For the transmission method of the 4-Fiber BLSR, there has been proposed a high-speed switching method using solely the APS bytes (Bellcore "GR-1230-CORE", Issue Dec. 1, 1993) in the prior art.

SUMMARY OF THE INVENTION

Simultaneous Digital Hierarchy (SDH) is standardized in order to achieve the improvement of network, the flexible multiplexing of various information, and the provision of multi-vendor telecommunication devices. In SDH, data will be transmitted on the frame basis, and for the overhead of transmission frames APS bytes (K1 and K2 bytes) are allocated to the control signals of line switching as described above.

APS bytes on the PTP (Point-to-Point) scheme and Ring scheme are standardized as shown in FIG. 31. This allows line switching of both linear and ring networks.

However, since the NPS network is a multi-line multi-node network, the previous APS bytes cannot be applied thereto. In addition, since a plurality of working lines are allocated to one protection line, an effective protection against multiple failures should be considered.

The problems of the switching method of the NPS network will be further described in greater details below.

First, when using APS bytes and DCC, there are problems that the switching is very complex and takes times for determining since a plurality of DCC are processed by one single controller.

Second, there are problems that when using APS bytes and a timer, the method is low in speed and its reliability is poor, since the signals from the source node indicating response are either arrived or not. Furthermore, all of the working lines and protection lines should pass through an identical path, resulting in the limitation of the installation of the transmission equipment and the transmission lines.

Also the BLSR as proposed above has following problems: In the BLSR which is a one to one system, protection lines corresponding to the transmission capacity of the working lines have to be installed. Therefore, the capacity of the whole ring should be determined by the capacity required for a span of maximum traffic. In FIG. 10, when only the traffic between the transmission equipment 115 and 116 is the maximum capacity in the network, the working line 119 is required to set the transmission capacity of the defined optic fibers to the maximum value as well as to build the transmission lines of whole ring at its maximum capacity value. As such, the capacity of whole network should be increased in order to augment only the traffic in a specific segment, so that there are problems on the effectiveness and the economic performance of the transmission lines.

As have been described above in greater details, switching of NPS network requires information about the number and the priority of working lines, and about the source and the destination nodes of the switching signals. If the switching is achieved by using APS bytes as used in the PTP or Ring schemes, the APS bytes capacity will be insufficient.

The main object of the present invention is to provide a network capable of realizing high speed transmission line switching method, transmission equipment to be used in said network, and a method for control thereof.

Now the overview of the present invention will be briefly summarized, and then various aspects of the present invention disclosed herein will be described hereinbelow in greater details.

The basic concept of the present invention is to allocate the number of the working lines, its priority, and the source node number of the switching signals among these items of information to the APS bytes. In addition a network table for storing the connecting status of networks and the failure information will be provided for each of nodes, thereby the destination node may be identified based on the working line number, the source node number which are included in the received APS bytes, and the connecting status of the network table.

An example of allocation of said various information in APS bytes is shown in FIG. 32. There are respectively two types of information items which are allocated to respective K1 bytes and K2 bytes in the APS bytes. For example, (1) priority, and (2) working line number are allocated to the K1 byte, and (1) source node number, and (2) switching status are allocated to the K2 byte. Of cource, (1) priority, and (2) working line number may be also allocated to the K2 byte, and (1) source node number, and (2) switching status may be also allocated to the K1 byte.

Also, in the present method APS bytes may be used not only for transmission line switching but also may be used for information update of the network table in other nodes so as to achieve rapid switching determination.

Here, the basic switching protocol of the present invention will be described below.

FIG. 33 shows the most basic switching protocol, in which, if a failure occurs at the time T1 in the working line # 1, the node B detects the failure to send a bridge request to the node A. The node A verifies whether the protection line # 0 has been insured to be used, then performs switching of transmitter side and informs it to the node B. Next, the node B switches the transmitter side and the receiver side then informs the node A of the completion of switching. The node A also switches the receiver side. All switching operation will be completed at the time T2.

Then, the switching protocol of the switching of multiple failures in accordance with the present invention. FIG. 34 shows an example of multiple failures. Here it is assumed that the line # 1 (failure SD) and line # 3 (failure SF) are already protected by using protection lines, and another failure SF has been further occurred in the line # 2. Here, following two rules should be defined: The SF (signal failure) should be higher priority than the SD (signal deterioration) [rule 1]. When the priority is the same, the switching of the line already protected will be retained [rule 2].

In the conventional switching method, the protection line between the nodes A and B, which protected the line # 1 will stop protecting the line # 1 according to the rule 1. However the protection line between the nodes B and C will continue to protect the line # 3 according to the rule 2. Therefore, both the line #1 and #2 will not be protected, so that the protection line between the node A and B will not be used effectively.

In accordance with the method of the present invention, the effective rate of protection lines will be improved by maintaining current protection and by exchanging information of failures newly occurred between nodes.

To achieve the method in the present invention, the number of the working line in which a failure has been newly occurred will be allocated. to the K1 byte for that APS bytes. And the priority of the currently protected working line and that of the working line of the newly occurred failure are multiplexed on the K1 bytes (for example, the SF on SD in FIG. 32).

Also, non-protectable SF should have lower priority than the SD [rule 3].

By exchanging failure information between nodes A and B by using the multiplexing function of the present invention, the protection line between nodes A and B which protected the working line #1 will continue to protect the working line #1 according to the rule 3. As a result, the protection of the line #2 may not be performed whereas the protection of the line #1 may be maintained, so that the protection line between nodes A and B may be efficiently used.

The conventional switching method has no compatibility between the PTP and Ring form. However, in accordance with the method of the present invention, if the form of the network changes from the linear one to the ring one, due to for example the addition of new nodes, it will be sufficient to solely update the Network Table. In this manner, the self-protecting method according to the present invention may use the network management software.

In addition, the self-protecting method according to the present invention may use the protection lines so as to achieve efficient protection since the protection lines are switched over after it is insured that the protection of failed line in case of multiple failures.

In addition, the self-protecting method according to the present invention may realize effective use of protection lines, as the switching to the protection lines is performed after the protection of failed lines is verified to be insured in case of multiple failures.

In addition, the self-protecting method according to the present invention may realize more reliable switching since it inherits the PTP method characterized by the one to N switching as well as the Ring method characterized by the Ring switching. In this manner, the self-protecting method accordance with the present invention may of course apply to the so-called NPS(Nested Protection Switching) type network.

Next, an exemplary embodiment of the present invention disclosed herein will be described in overview.

The network of the present example is a network comprising K transmission equipment (where K is integer not less than three), (K–1) protection lines connecting said transmission equipment in a straight chain form, and a plurality of working lines connecting said transmission equipment, and having overhead in transmission frames, characterized in that when a failure occurs in one of the working lines, all of the switch control information concerning the failure may be exchanged among the transmission equipments, more preferable all of the transmission equipments, the transmission equipment of the network by using automatic switching bytes in the overhead of the transmission frames, for switching the transmission lines based on the switch control information.

The overhead comprised the transmission lines means the area for transmitting operational maintenance information of the network. Also, the automatic switching bytes in the overhead is used for exchange of signals for controlling the system switching among transmission terminal devices, as well as for display of alert status. In a SONET or SDH network, the automatic switching bytes is called as APS bytes, which in general is comprised of two areas of K1 byte and K2 byte.

Thus the present invention may be very useful to be applied to the typical SONET or SDH network The typical network according to the present invention is a SONET or SDH network comprised of K transmission equipment (where K is integer not less than three), (K–1) protection lines connecting said transmission equipment in a straight chain form, and a plurality of working lines connecting said transmission equipment, characterized in that when a failure occurs in one of the working lines, all of the switch control information concerning the failure may be exchanged among the transmission equipments of the network, more preferable all of the transmission equipment of the network, by using APS bytes in the overhead of the SONET or SDH frames, for switching the transmission lines based on the switch control information.

Another aspect of the present invention is a Ring form as follows: it includes a network K transmission equipment (where K is integer not less than three), K protection lines connecting said transmission equipment in a ring form, and a plurality of working lines connecting said transmission equipment, and having overhead in the transmission frames, as well as at least one of the transmission equipment is connected to three or more working lines, characterized in that when a failure occurs in one of the working lines and the protection lines, all of the switch control information concerning the failure may be exchanged among all of the transmission equipment of the network by using automatic switching bytes in the overhead of the transmission frames, for switching the transmission lines based on the switch control information.

Therefore, the present invention may be very useful to be applied to the typical SONET or SDH network in case of Ring form as well.

Next, the transmission equipment according to the present invention have following structure:

Transmission equipment comprising: a connecting unit for a plurality of working lines, a connecting unit for a plurality of protection lines, a monitoring unit for monitoring anomalies in said working lines, a transmitter/receiver for information stored in the area for automatic switching in the overhead for exchanging failure information with adjacent transmission equipment through a protection line, a Network Table for storing the connection status of the network and failure information, a processing unit for setting the transmission line switching and for notifying the setting of the transmission line switching to said adjacent transmission equipment, based on the information stored in said Network Table, the information of the results of monitoring transmission lines by said monitor, and the information stored in the area for automatic switching in the overhead.

In addition, the data indicating said network structure may comprise connection information among the transmission equipment of the working lines, connection information among the transmission equipment of the protection lines, transmission equipment number assigned to a working line, and current failure information of the transmission line in the network.

In Ring form network, the data indicating said network structure may comprise connection information among the transmission equipment of the working lines, connection information among the transmission equipment of the protection lines, transmission equipment number, path information of the protection line used for protecting signals of the working lines, number assigned to a working line, and current failure information of the transmission line in the network.

The transmission equipment according to the present invention may be very useful to be applied to the typical SONET or SDH network. And it may be also applied to the liner form, the Ring form, and NPS form of the network.

In the transmission equipment according to the present invention said data indicating the network structure may be dynamically updated by the signal from the processor.

Next, various embodiments of the transmission line switching method according to the present invention will be described.

One embodiment of the transmission line switching method according to the present invention is a method for controlling transmission line switching which may be performed by the processor of the transmission equipment used in a network which comprises K transmission equipment (where K is integer not more than three), K−1 protection lines connecting said transmission equipment in a straight chain form, and a plurality of working lines connecting said transmission equipment, comprising the steps of:

(1) first, analyzing the contents of received APS bytes;
(2) second, processing transmitting APS bytes according to the results of the analysis;
(3) third, updating a Network Table according to the results of the analysis; and
(4) fourth, setting the direction of transmission of the processed APS bytes.

Another embodiment of the transmission line switching method according to the present invention is a method for controlling transmission line switching which may be performed by the processor of the transmission equipment used in a network which comprises K transmission equipment (where K is integer not more than three), K protection lines connecting said transmission equipment in a ring form, and a plurality of working lines connecting said transmission equipment, at least one of the transmission equipment being connected with three or more working lines, comprising the steps of:

(1) first, analyzing the contents of received APS bytes;
(2) second, processing transmitting APS bytes according to the results of the analysis;
(3) third, updating a Network Table according to the results of the analysis; and
(4) fourth, setting the direction of transmission of the processed APS bytes.

Still another embodiment of the method for controlling transmission line switching according to the present invention is as follows, and will be described based on the above described two basic methods of controlling transmission line switching.

Thus, in the above two methods of controlling transmission line switching, said second step includes the step of generating request signal for triggering switching, and said fourth step includes the step of setting the transmission direction of the request signal in the path used for the protection, based on the data stored in the Network Table.

In addition, still another embodiment of the method for controlling transmission line switching according to the present invention is as follows: in the above two methods of controlling transmission line switching, said second step includes the step of generating status signal indicating switching status, and said fourth step includes the step of setting the transmission direction of said status signal in the path not used for protection.

Still another embodiment of the method for controlling transmission line switching according to the present invention is as follows: in the above two methods of controlling transmission line switching, if the APS bytes received in the first step is a request signal indicating switching trigger, and bridging request, and is sent to that equipment, said second step includes the step of generating APS bytes indicating response to the bridge request of the transmission equipment.

Still another embodiment of the method for controlling transmission line switching according to the present invention is as follows: in the above two methods of controlling transmission line switching, if the APS bytes received in the first step is a request signal indicating switching trigger and bridging request, and is sent to that equipment, said second step includes the step of generating APS bytes indicating protection request of the transmission equipment.

Still another embodiment of the method for controlling transmission line switching according to the present invention is as follows: in the above two methods of controlling transmission line switching, if the APS bytes received in the first step is a request signal indicating switching trigger and protection request, and is sent to that equipment, said second step includes the step of generating APS bytes indicating protection request of the transmission equipment.

Still another embodiment of the method for controlling transmission line switching according to the present invention is as follows: in the above two methods of controlling transmission line switching, if the APS bytes received in the first step is sent to another equipment and is a request signal indicating switching trigger, when that transmission equipment performs switching, said second step includes the step of regenerating APS bytes.

Still another embodiment of the method for controlling transmission line switching according to the present invention is as follows:

Thus, in the above two methods of controlling transmission line switching, when detecting or receiving a plurality of failure information at a transmission equipment, said second step includes the step of generating APS bytes multiplexing said plurality of failure information.

Still another embodiment of the method for controlling transmission line switching according to the present invention is as follows:

Thus, in the above two methods of controlling transmission line switching, if the APS bytes received in the first step is sent to another equipment, and is request signal indicating switching trigger, and if the protection line opposed to the direction of receiving is already used for the protection of another failure, and if the importance level of the received APS bytes is higher than that of the protected failure, said second step includes the step of generating APS bytes multiplexing information on the fact that the switching of working line protected from the failure has been completed, and bridging request of the received APS bytes, and said fourth step includes the step of setting the direction of transmission of the generated APS bytes as to the direction opposed to the receiving direction of the APS bytes. Furthermore, if the APS bytes received in the first step is sent to another equipment, and is request signal indicating switching trigger, and if the protection line opposed to the direction of receiving is already used for the protection of another failure, and if the importance level of the received APS bytes is lower than or equal to that of the protected failure, the second step includes the step of generating APS bytes including switching reject, and the fourth step includes the step of setting the direction of transmission of the generated APS bytes as to the receiving direction of the APS bytes.

Still another embodiment of the method for controlling transmission line switching according to the present invention is as follows, and will be described based on the above described two methods of controlling transmission line switching.

Thus, in the above two methods of controlling transmission line switching, if the APS bytes received in the first step is sent to another equipment and is request signal indicating switching trigger, and if the protection line opposed to the direction of receiving is already used for the protection of another failure, and if the importance level of the received APS bytes is higher than that of the protected failure, said second step includes the step of generating APS bytes multiplexing information on the fact that the switching of working line protected from the failure has been completed, and switching reject of the received APS bytes, and said fourth step includes the step of setting the direction of transmission of the generated APS bytes as to the direction opposed to the receiving direction of the APS bytes.

Still another embodiment of the method for controlling transmission line switching according to the present invention is as follows: in the above two methods of controlling transmission line switching, if the APS byte received in the first step indicates switching reject, and is determined to be sent to that equipment, said third step includes the step of decreasing the importance level of request causing said switching reject, and updating data in the Network Table.

Still another embodiment of the method for controlling transmission line switching according to the present invention is as follows: in the above two methods of controlling transmission line switching, if the APS byte received in the first step indicates switching reject, and is determined to be sent to that equipment, said third step includes the step of determining whether or not there is a different path from the path of the protection line used for protection stored in the Network Table, and if there is another path, updating the path information of the protection line used for signal protection of the working line stored in the Network Table.

Still another embodiment of the method for controlling transmission line switching according to the present invention is as follows: in the above two methods of controlling transmission line switching, if the APS bytes received in the first step indicates switching reject, and is determined to be request signal indicating switching trigger, when that transmission equipment does not perform switching, the second step includes the step of transferring the received APS bytes as transmission APS bytes without changing.

Still another embodiment of the method for controlling transmission line switching according to the present invention is as follows: in the above two methods of controlling transmission line switching, if the APS bytes received in the first step is determined to be status signal indicating switching status, the second step includes the step of transferring the received APS bytes as transmission APS bytes without changing.

Furthermore, the method for controlling transmission line switching according to the present invention includes APS bytes including the number of the working line of the highest importance level, the number of source node of the signal, and the response status of switching in the source node.

BRIEF DESCRIPTION OF THE DRAWINGS

FIG. 2 shows a basic signal flowchart according to the present invention;

FIG. 3 shows an example of the structure of APS bytes according to the present invention;

FIG. 24 shows a time chart of APS bytes at the time of occurrence of multiple failures (part four);

FIG. 31 shows prior APS bytes;

FIG. 32 shows APS bytes according to the present invention;

FIG. 33 shows an example of basic operation of switching protocol according to the present invention; and FIG. 34 shows an example of basic operation of switching protocol in case of multiple failures according to the present invention.

DESCRIPTION OF THE PREFERRED EMBODIMENTS

Practical embodiments of the self-healing network, its transmission equipment, and transmission line switching method according to the present invention will be respectively described with reference to accompanying FIG. 1 through FIG. 8 and FIG. 11 through FIG. 30 hereinbelow.

Basic concept of the present invention is a self-healing network in which switch control information may be exchanged among all of the transmission equipment constructing the network by using APS bytes, and transmission line switching may be performed based on the switch control information. This specification will disclose the form of this network, the transmission equipment used for the network, and the transmission line switching method. Herein the APS bytes indicates K1 and K2 bytes being defined in the overhead zone used in the SONET/SDH network. These bytes will be used for switching control.

Figure 1:
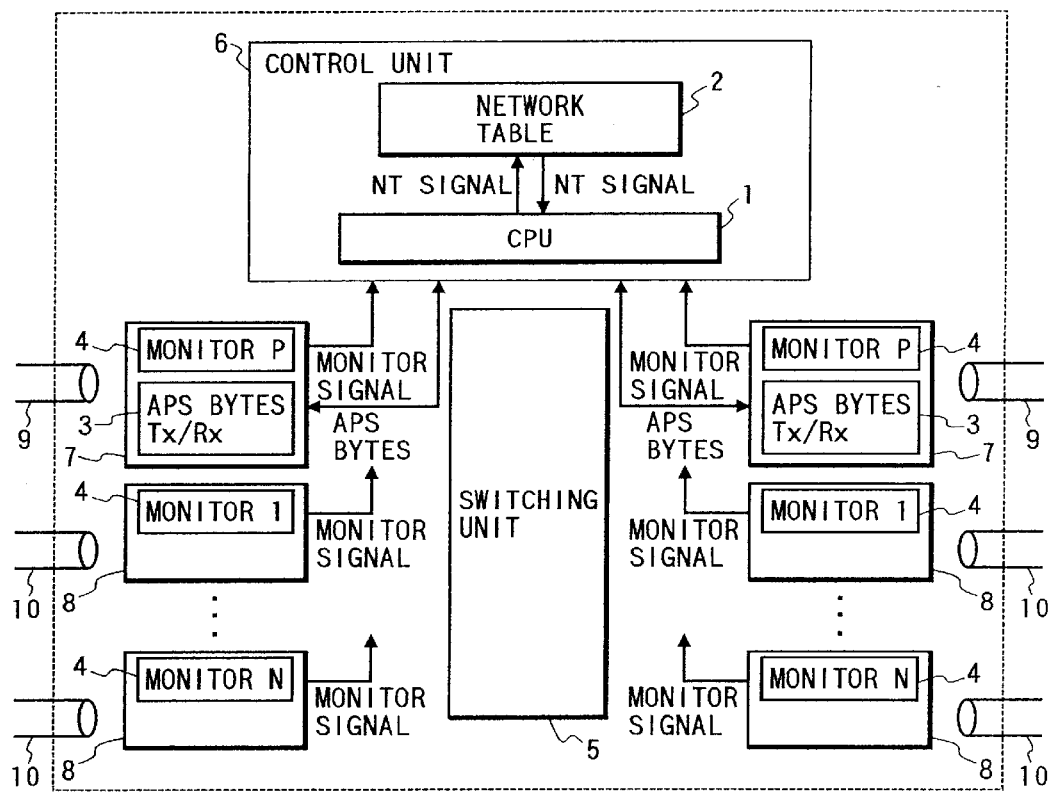
FIG. 1 shows a block diagram indicating an overview of the structure according to the present invention.

FIG. 1 shows a schematic block diagram of a transmission equipment illustrating one of the embodiments according to the present invention. This transmission equipment incorporates signal protection device. In the network according to the present invention, each of the transmission equipment in the network comprises the basic structure shown in FIG. 1. Controller 6 is composed of hardware having processor 1 and Network Table 2 therewithin. Working line 10 is terminated by a working line terminator 8. The working line terminator 8 includes a monitor 4.

On the other hand, protection line 9 is terminated by a protection line terminator 7. The protection line terminator 7 has a monitor 4 and APS bytes transmitter/receiver 3 therewithin. It should be noted that only the protection lines have APS bytes transmitter/receiver. In FIG. 1 only the flow of control information as sub-signal is shown.

Each transmission equipment has a switcher 5 for switching main signal.

A monitor 4 monitors the working lines, and when detected a failure, it sends the failure information to the processor 1 by using monitor signal. A APS bytes transmitter/receiver receives APS bytes transmitted from other transmission equipment to send to the processor 1, which analyzes both the signal from the monitor and the received APS bytes to read out data stored in Network Table by NT response signal to process the APS bytes. The processing of the APS bytes comprises allocation of bit pattern. As a result, processor 1 transfers the processed APS bytes to the APS bytes transmitter/receiver 3, and dynamically update the data in the Network Table by using NT processing signal.

One to N type transmission system having a plurality of transmission equipment has a plurality of working lines. There are two kinds of failures if there are occurred failures in the plurality of working lines in such transmission system at the same time. The first is a status in which failures are not occurred overlapped in the path of one protection line used for protection, called hereinafter an "isolated failure". The second is a status in which failures are occurred overlapped in one protection line, called hereinafter an "overlapped failure".

When the monitor 4 of a transmission equipment detects an isolated failure, the monitor transmits the detected failure information of working line to the processor 1. When the processor 1 receives the detected failure information from the monitor 4, it verifies the current status by querying the network table, determines which working line is to be switched based on the verification, and generate APS bytes indicating bridge request. The APS bytes the generated will be transmitted to the APS bytes transmitter/receiver.

At that time, the transmission equipment detecting failure transmits APS bytes including bridge request to the destination node to wait the bridge response. The response signal is not shown in FIG. 1.

In case of transmission equipment requiring switching, the processor 1 analyzes the contents of received APS bytes. Then based on the analysis, if bridge request has been received, the processor 1 switches the transmission data, generates APS bytes including response to the bridge request, and transfers thus generated APS bytes to the APS byte transmitter.

In the processor 1, the contents of received APS bytes will be analyzed. If a bridge response is received, APS bytes including protection request to complete switching of transmission/reception data and to maintain switched status will be generated to be sent to the APS byte transmitter.

The processor 1 analyzes the contents of received APS bytes. When the processor 1 receives protection request, it completes switching of received data, generates APS bytes including response to the protection request, and transfers the generated APS bytes to the APS bytes transmitter. The basic switching operation between the processor 1 and monitor and APS bytes transmitter will be completed.

In a transmission equipment already failure is protected, the processor 1 queries the network table when receiving failure information. Then if the importance level of the received bridge request is higher than the importance level of the protection request of failure already switched, the processor 1 will determine which working line is to be switched. Thereafter, APS bytes will be generated which includes overlapped bridge request which multiplexes information on the fact that the switching of the working line of failure already protected has been completed, with information of bridge request of receiving APS bytes will be sent to the APS byte transmitter 3. If the importance level of the bridge request of failure already switched is lower than the importance level of the failure protected, the processor 1 generates APS bytes including bridge reject to send to the APS bytes transmitter/receiver 3. At this step APS byte will be processed without changing switching status.

In a transmission equipment not concerning to the switching, the processor 2 will transfer the APS bytes without processing in order to speed up the processing time.

FIG. 2 shows a sequence flow of basic signals. At first the kinds of APS bytes will be described.

The APS bytes signals are classified into "request signal" and "status signal". The request signal is a signal which will become switch trigger. This signal will be sent to the request path of the protection line used for the protection of a failure, to be used for the determination of the transmission line switching of transmission equipment. The status signal will be sent to the status path of the protection line not used for the protection of failure to notify other transmission equipment about failure information and switching information. Thereby the network information will be shared among all of the transmission equipment.

The sequence flow of the request signal which will become switching trigger will be described below in greater details. FIG. 2 shows a working line terminated by the transmission equipment A and transmission equipment B.

Now assuming that a failure has been occurred in this working line, and that the failure has been detected by the transmission equipment B. The transmission equipment B will send a bridge request to the transmission equipment A. The transmission equipment A receiving the bridge request will switch the transmitted data and send the response to the bridge request to transmission equipment B. The transmission equipment B receiving the response to the bridge request will switch the transmitted data and the received data and send protection request for maintain the switching completed status to the transmission equipment A. The transmission equipment A receiving the protection request will switch the received data to send the response to the protection request to the transmission equipment B. Thereby the sequence of switching operation between the transmission equipment A and the transmission equipment B will be completed.

FIG. 3 shows an example of the contents of information carried by the APS bytes. The APS bytes comprises so-called "K1" and "K2" bytes; these K1 and K2 bytes both comprises 2 bytes of area added as the redundant signal of the frames used in the SONET/SDH.

The K1 bytes includes "SW Priority" for indicating information on the priority of the failed status, and "Channel ID" for indicating working line number of the occurred failure. The K2 bytes includes "source ID" for indicating the source transmission equipment, "request/status signal" for indicating whether the type of K1 and K2 bytes is request signal or status signal, and "Status indicating code" for indicating current switching status of the source transmission equipment.

Figure 4:
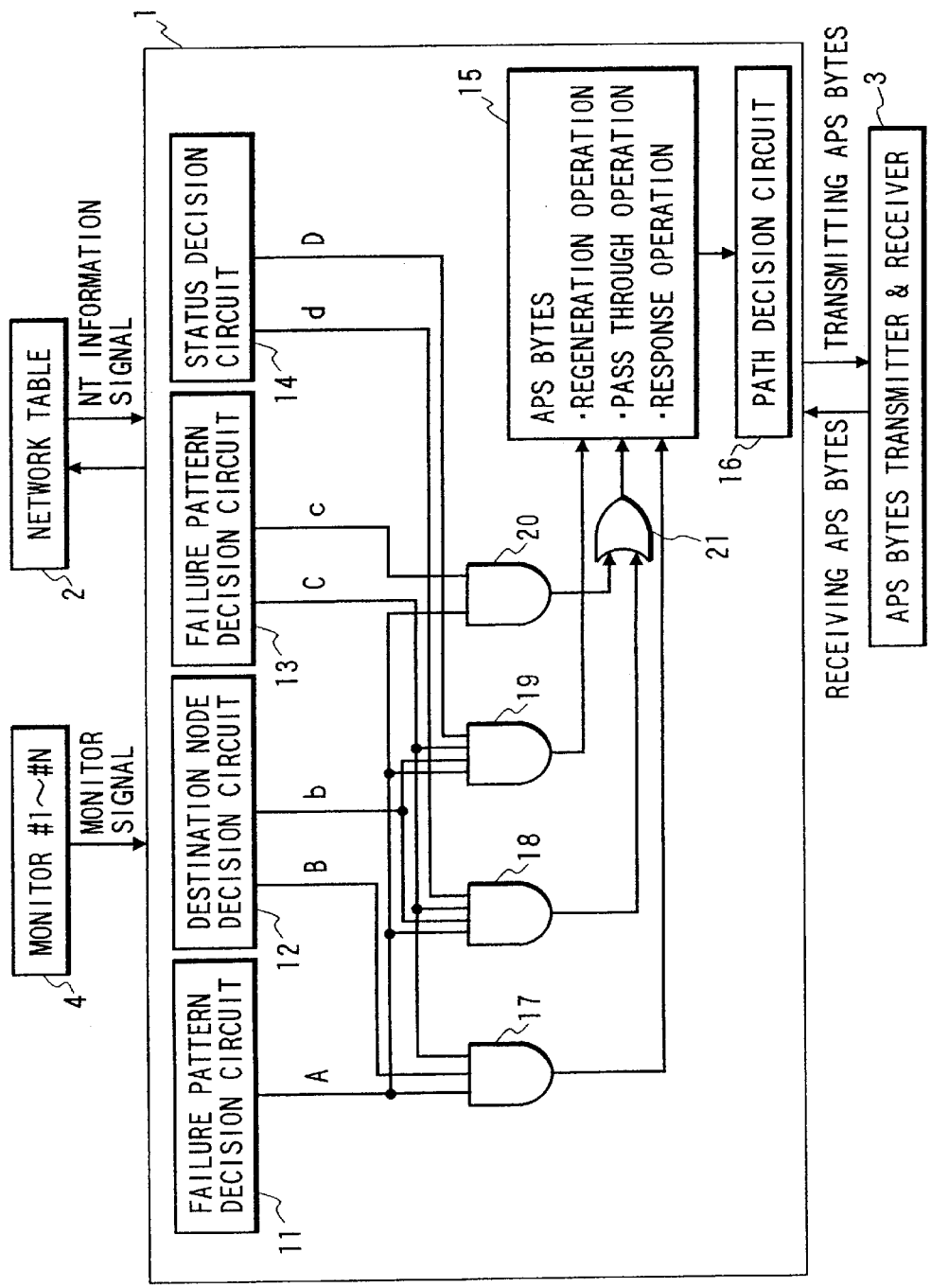
FIG. 4 shows a block diagram of an embodiment according to the present invention.

FIG. 4 shows a detailed block diagram corresponding to the overview of the structure in FIG. 1, in which the processor 1 is comprised of a failure pattern decision circuit 11, a destination node decision circuit 12, a signal decision circuit 13, a status decision circuit 14, an APS bytes processing circuit 15, a path decision circuit 16, AND gate circuits 17 through 20, and OR gate circuit 21.

The failure pattern decision circuit 11 has function of extracting the priority of occurred failure from the K1 bytes of the received APS bytes to compare it with a plurality of predetermined failure patterns to determine whether or not there exists a matched pattern therein. As the results of comparison, if there is a matched pattern, the circuit outputs A, which will be transferred to the input terminals of the AND gate circuits 17, 18, 19, and 20.

The destination node decision circuit 12 has function of extracting the channel ID of occurred failure from the K1 bytes of the received APS bytes to determine whether or not the destination node of the APS bytes indicates its own transmission equipment from the data stored in the Network Table 2. As the result of this decision, if it is its own transmission equipment, the circuit output B, if it is not its own transmission equipment then the circuit outputs b. Output B will be transferred to the input terminals of the AND gate circuit 17, whereas the output b will be transferred to the 18 through 19.

The signal decision circuit 13 has function to determine whether or not the APS bytes indicates a request signal or a status signal from the K2 bytes of the received APS bytes. As the result of this decision, if it is a request signal, the circuit outputs C, if it is a status signal then the circuit outputs c. Output C will be transferred to the input terminals of the AND gate circuits 17 through 19, whereas the output c will be transferred to the AND gate circuit 20.

The status decision circuit 14 has function to determine whether or not a switching has been already completed for protecting a failure at its own transmission equipment, from the data stored in the Network Table 2. As the result of this decision, if the switching has been performed, the circuit outputs D for regenerating the received APS bytes, and if the switching has not been performed, the circuit outputs d for transferring the received APS bytes. Output D will be transferred to the input terminal of the AND gate circuits 19, whereas the output d will be transferred to the input terminal of the AND gate circuits 18.

The APS bytes processing circuit 15 has function of processing APS bytes. the APS bytes processing circuit 15 may perform any one of response, PT, or regenerating operation based on the information derived from the received APS bytes and the Network Table.

The response will be performed in a transmission equipment concerning to the switching to be done by a request signal. The PT operation will be a transfer of request signal or status signal. The regeneration will be performed for multiplexing or demultiplexing to the APS bytes a protection request protecting a failure and a bridge request of newly occurred failure for transmitting a bridge request when a switching is being performed in a transmission equipment, without changing the switching status. The PT and regeneration are to be performed in a transmission equipment not concerning to the switching performed by the switching request of a newly occurred failure.

The response operation will be triggered by the AND gate circuits 17 in the following conditions: (1) at the failure pattern decision circuit 11 the status of failure matches a stored pattern, (2) at the destination node decision circuit 12 the APS bytes are determined to be sent to that node, and (3) the signal decision circuit 13 determines that it is a request signal.

The PT (pass through) operation includes following two operations:

In the first condition, the PT is triggered by the OR gate circuit 21 through the AND gate circuits 18. Here the first condition means (1) at the failure pattern decision circuit 11 the status of failure matches to a stored pattern, (2) the destination node decision circuit 12 determines that the APS bytes are not sent to that node, (3) the signal decision circuit 13 determines that it is a request signal, and (4) the status decision circuit 14 determines that its own transmission equipment does not perform switching.

In the second condition, the PT is triggered by the OR gate circuit 21 through the AND gate circuits 20. Here the second condition means that the failure pattern decision circuit 11 determines that the failed status matches to one of stored patterns and that the signal decision circuit 13 determines that it is a status signal.

The regeneration operation is triggered by the AND gate circuits 19. This condition means (1) at the failure pattern decision circuit 11 the failed status matches to a failed pattern, (2) the destination node decision circuit 12 determines that the APS bytes is not sent to that node, (3) the signal decision circuit 13 determines that it is a request signal, and (4) the status decision circuit 14 determines a regeneration to be performed.

The APS bytes processing circuit 5 sends the processed APS bytes to the path decision circuit 16. The APS byte path decision circuit 16 refers to the instruction from the APS bytes processing circuit 15 and to the data stored in the Network Table 2 to set the transmission path to transfer the transmission direction information and the APS bytes to the APS bytes transmitter/receiver 3.

The processor 1 may be implemented as hardware arrangement as described above. It may also be realized as software by using CPU. FIGS. 5, 6, 7, and 8 illustrate the operation flow of the embodiment according to the present invention in case that the processor 1 will be achieved as a software.

[Flow at the Processor]

Figure 5:
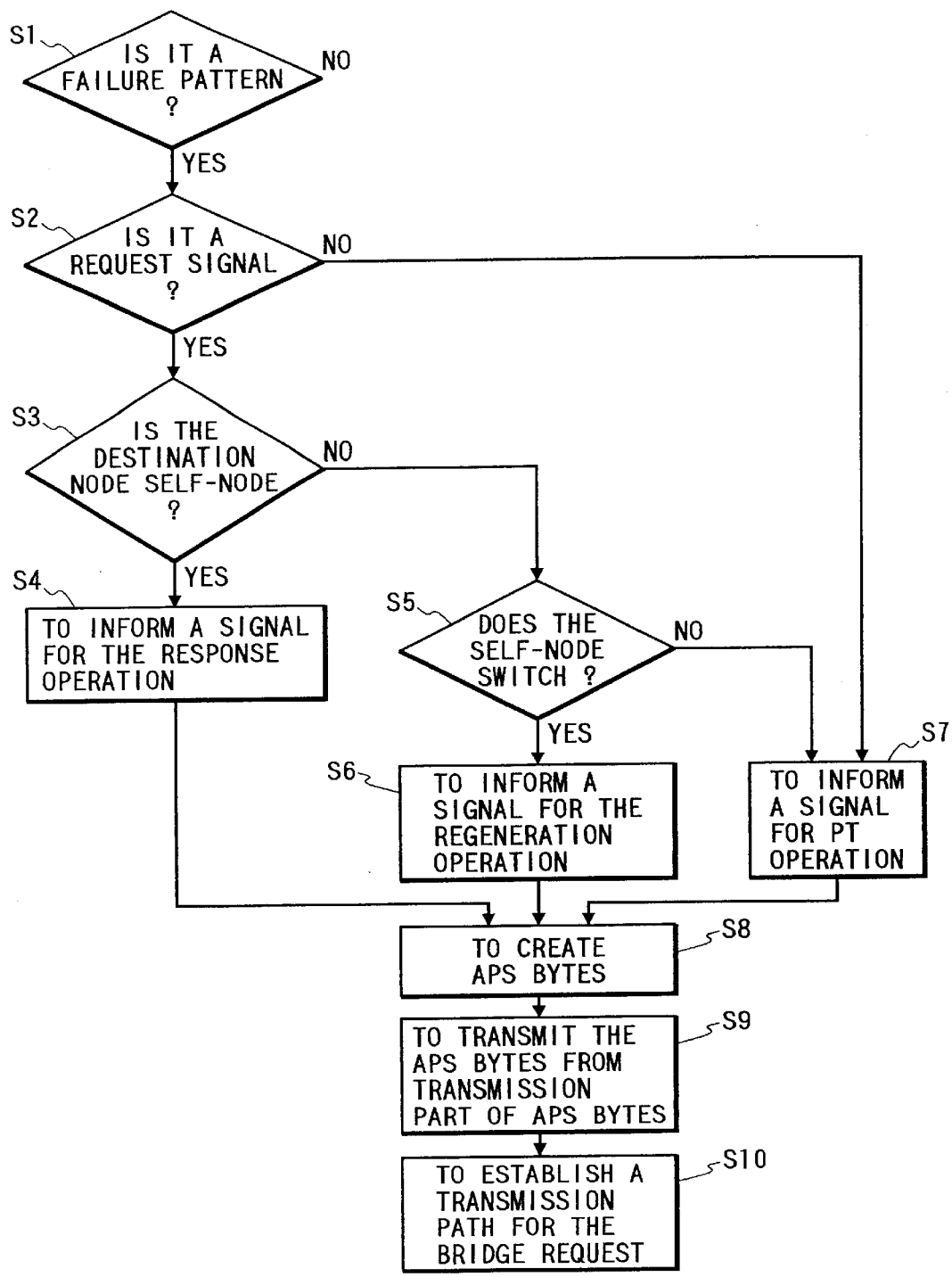
FIG. 5 shows a flowchart indicating basic operation according to the present invention.

The steps shown in FIG. 5 will be described below in greater details. Here the reference numerals within a parenthesis indicates respective steps.

(S1) comparing the SW Priority for indicating the priority of the failed status of the received APS bytes with a plurality of predetermined failure patterns and determining whether it matches to one of them.

(S2) determining whether the received APS bytes signal indicates a request signal if the failed pattern matches to one of a plurality of predetermined failure patterns.

(S3) if the received APS bytes signal is determined to be a request signal, determining whether the APS bytes is for that node (it is shown as "self-node" in Figure) by referring to the path information of the working lines stored in the Network Table from a Channel ID in the K1 bytes of the APS bytes.

(S4) notifying as response operation if the APS bytes are for that node.

(S5) in step (S3), if the APS bytes are not for that node(it is shown as "self-node" in Figure), it is determined whether or not that node protects other failures to perform switching.

(S6) notifying as regeneration operation if the switching is determined to be performed.

(S7) in step (S5), if the switching is not performed at that node, it is notified as PT operation. Furthermore in the step (S2) if the received APS bytes signal is not determined to be a request signal, it is notified as PT to the APS bytes processing circuit.

Figure 6:
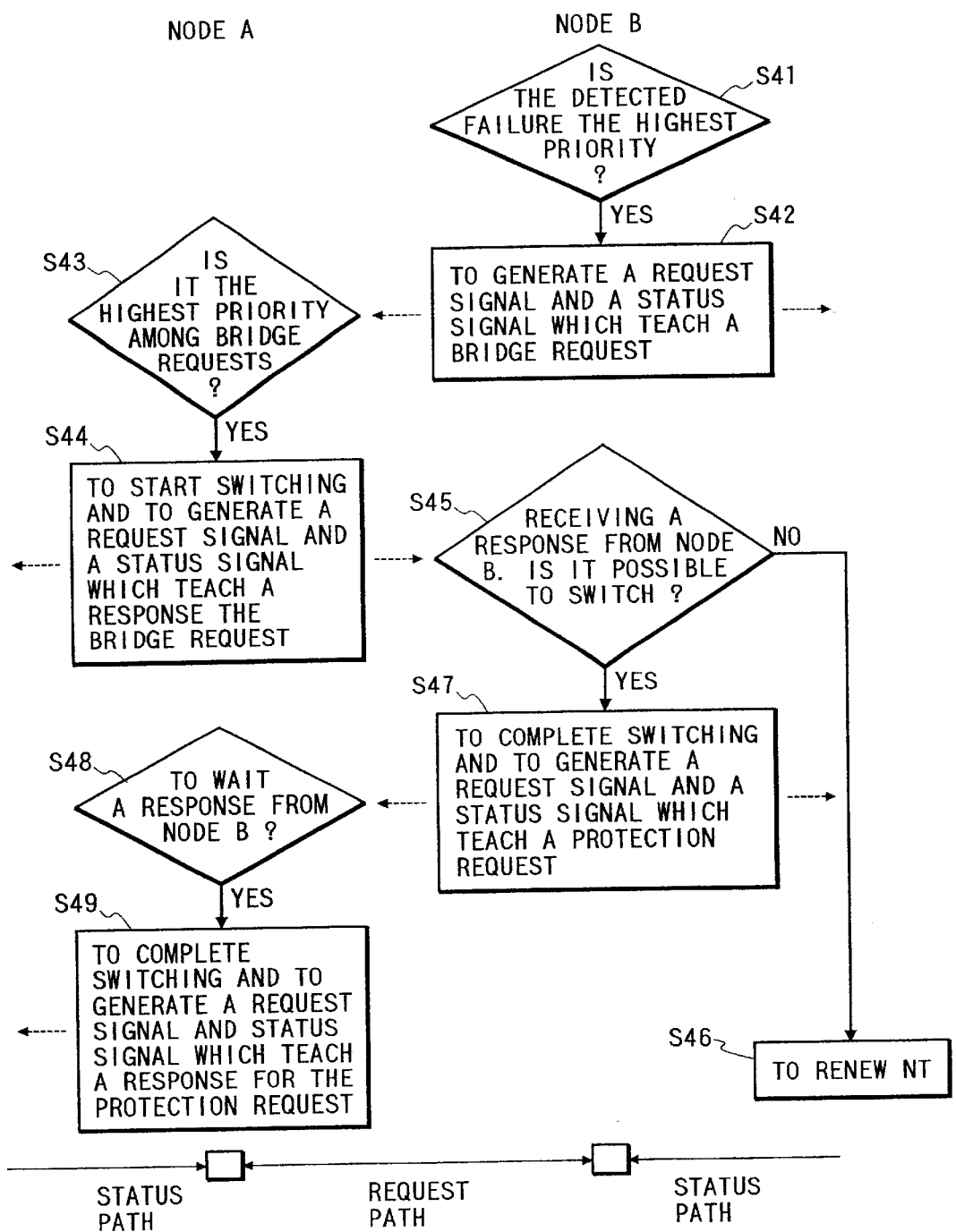
FIG. 6 shows a flowchart indicating response operation according to the present invention.
Figure 7:
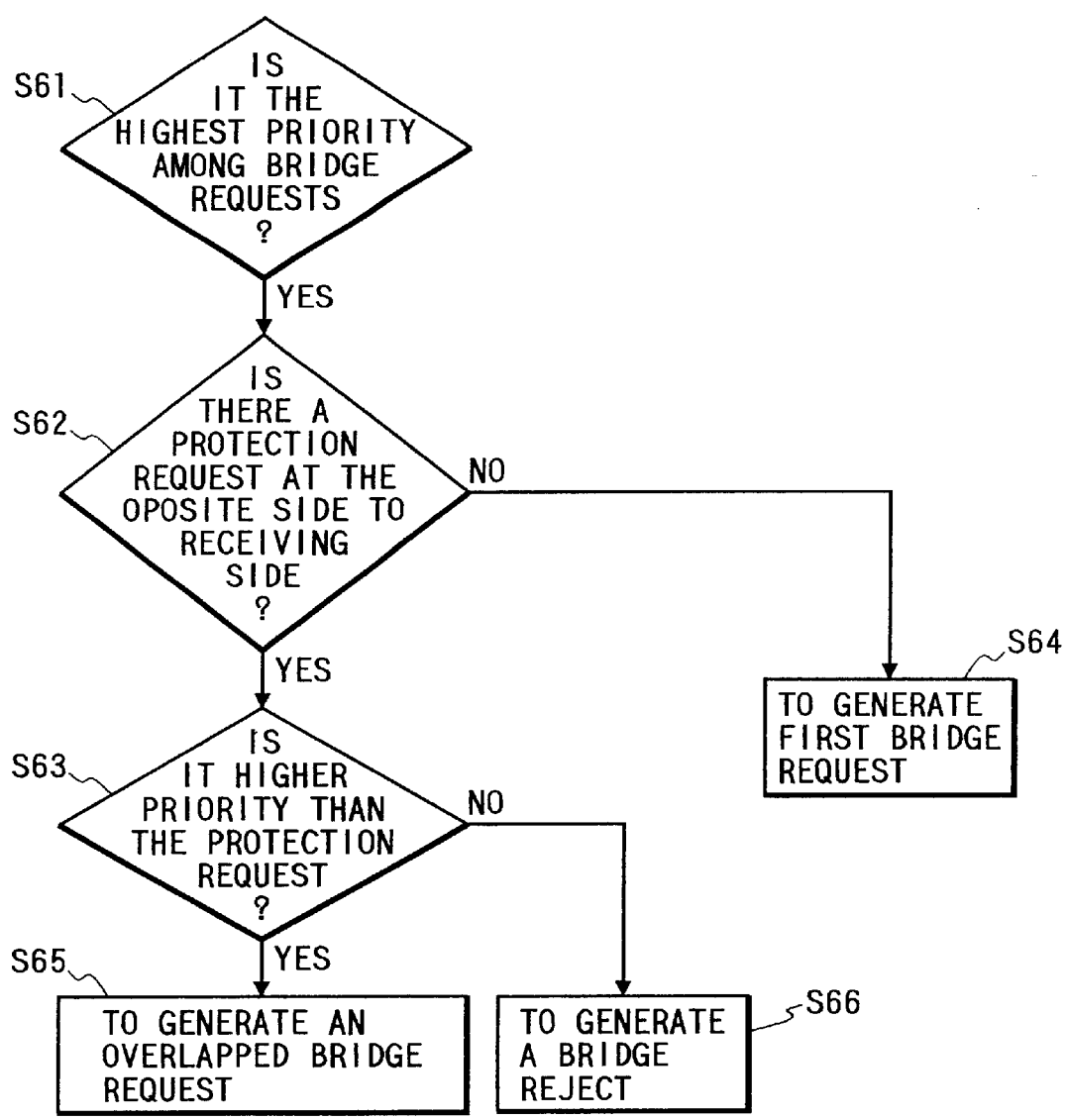
FIG. 7 shows a flowchart indicating regeneration operation according to the present invention.

(S8) the APS bytes processing circuit instructed to response operation performs switching and generates APS bytes indicating response. FIG. 6 shows the flow of this operation. If notified as regeneration operation, it regenerates APS bytes. FIG. 7 shows the flow of this operation. The APS bytes processing circuit notified to perform PT operation transfers APS bytes to the APS bytes transmitter according to the flow shown in FIG. 8.

The APS bytes will be processed according to the notified method of operation.

(S9) The processed APS bytes will be set based on the path information obtained from the Network Table such that the request signal may be set to the request path used for signal protection, and the status signal may be set to the status path not used for the signal protection.

(S10) inserting the APS bytes into the overhead at the APS bytes transmitter 3 to transmit.

[Response]

The response will be described below in greater details. FIG. 6 shows the flow of response. Here the reference numerals within a parenthesis indicates respective steps of FIG. 5. It should be noted that in FIG. 6, status path and request path indicates the protection lines between nodes.

The APS byte processor of the transmission equipment B will response after receiving notification of response sent by (S4).

First the transmission equipment detecting a failure (for example, see the transmission equipment B in FIG. 6) determines whether or not the priority of the failure is the highest priority among the request paths used for protecting data (step S41). The result of determination of the level of failure will be sent to the APS byte processor circuit.

Next, following two request signal reflecting the result of the determination of the level of failure will be generated (S4):

(1) if the priority is highest and protection request exists on the request path, a request signal indicating multiplexed overlapped bridge request will be generated.

(2) if the priority is highest and protection request does not exist on the request path, a request signal indicating non-multiplexed isolated bridge request will be generated.

In addition, the APS bytes processing circuit in the transmission equipment B will generate two kinds of above described "request signals" as well as generate "status signals" for notifying status. Then, another transmission equipment concerning switching, i.e., opposing node (the transmission equipment A will be referred as to an opposing node, indicating that transmission equipment is opposed to the transmission equipment B, in the description of signal transmission hereinafter) will be notified. This request signal will be transferred to the APS bytes transmitter/receiver of other transmission equipment (i.e., except the transmission equipment A and B) after it will have been set to transmit to the request path used for protecting data. The status signal on the other hand will be sent to the APS bytes transmitter/receiver of the other node after it will have been set to transmit to the status path not used for protecting data. Thereafter, response will be awaited from the opposing node, i.e., the transmission equipment A in this case (S45).

At the opposing node. the determination will be made whether or not the priority of the failure of the received APS bytes is the highest among the request paths (S43). The result of the determination will be sent to the APS bytes processing circuit, which circuit receives the result of the determination determines to switch data to the protection lines if the priority of the failure is highest, and generates the "request signal" indicating response to the bridge request and "status signal". At this time, the opposing node notifies to the transmission equipment having detected the failure (i.e., transmission equipment B) response to the bridge request by using status indication (S44). The APS bytes processing circuit will set it to transfer to the APS bytes transmitter/receiver of other node such that the "request signal" will be transmitted on tie request path, and that the "status signal" on the status path, respectively. Then, the transmission equipment A will wait for response from the transmission equipment having detected the failure (transmission equipment B) (S48).

The transmission equipment having detected the failure (transmission equipment B) will complete switching data of the working line of detected failure to the protection line, if it receives the "bridge response" indicating that switching is available from the opposing node. And the transmission equipment B will generate a request signal indicating protection request and a status signal. Also, the transmission equipment B will notify "protection request" based on the Status indication to the opposing node (transmission equipment A) (S47).

On the other hand, when the transmission equipment B receives a "bridge reject" indicating that switching is not available from the opposing node, the transmission equipment B changes the request path used for the protection of the Network Table, it is attempted to perform again the response flow as have been described above from the first step S41. If there exists no path available to use for the protection, the transmission equipment B will decrease the priority of the failure (S46).

When the opposing node (transmission equipment A) receives notification of the completion of switching at the transmission equipment having detected the failure, the transmission equipment A completes switching of data, and generates a request signal indicating response to the protection request and a status signal. The protection request will be sent to the opposing node (transmission equipment A) by using the Status Indication (S49).

[Regeneration at the APS Byte Processing Circuit]

FIG. 7 shows a flowchart of the regeneration as described above.

When receiving "regeneration notification" as shown in the step S6 of FIG. 7, the regeneration will be performed. First, it is determined whether or not the priority of the received APS bytes is the highest (S61). In this decision, if the received APS bytes have the highest priority among the bridge requests, the APS byte processing circuit determines whether or not there exists a protection request in a direction opposed to the receiving direction of the received APS bytes (S62).

On contrary, it will be determined whether or not the priority of the received APS bytes is higher than that of protection request (S63). If the priority of the received APS bytes is higher than that of the protection request, the APS byte processing circuit generates an "overlapped bridge request" (S65). On the other hand, if the priority of the received APS bytes is not higher than that of the protection request, the APS byte processing circuit generates "bridge reject" (S66).

In step S62, if no "protection request" exists in the received APS bytes, the "isolated bridge request(first bridge request)" will be generated (S64).

If a "bridge reject" is received, the multiplexing and demultiplexing of "bridge reject" and "protection request" will be performed in a manner similar to the regeneration of the "bridge request".

[PT (Pass Through)]

Figure 8:
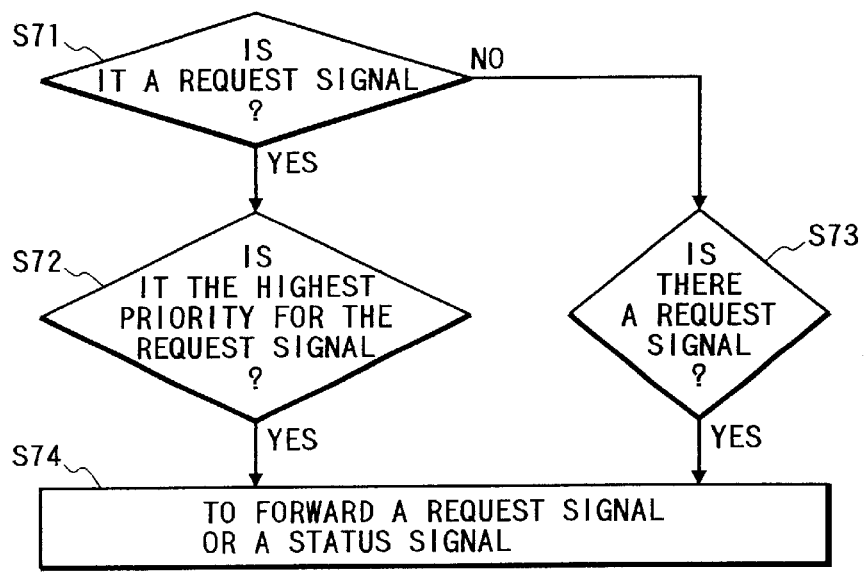
FIG. 8 shows a flowchart indicating operation of PT according to the present invention.
Figure 9:
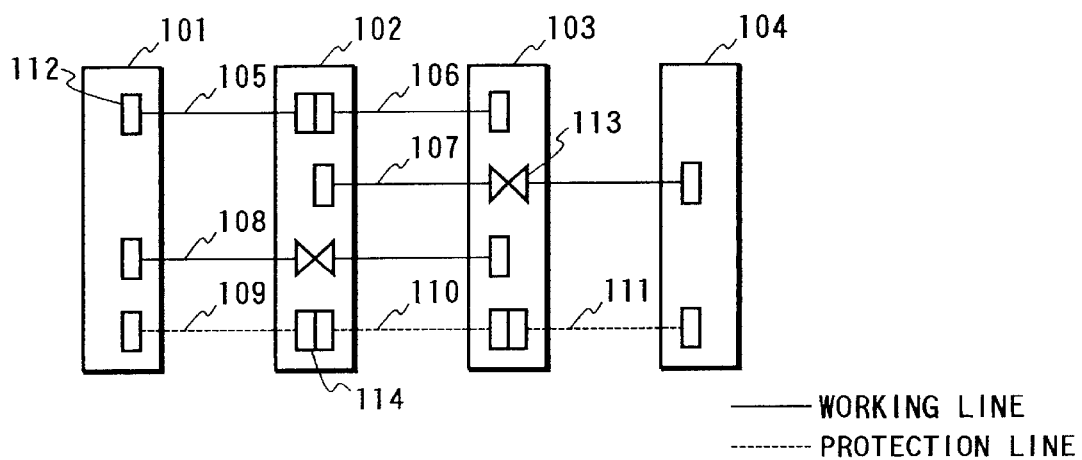
FIG. 9 shows an example of NPS arrangement.
Figure 10:
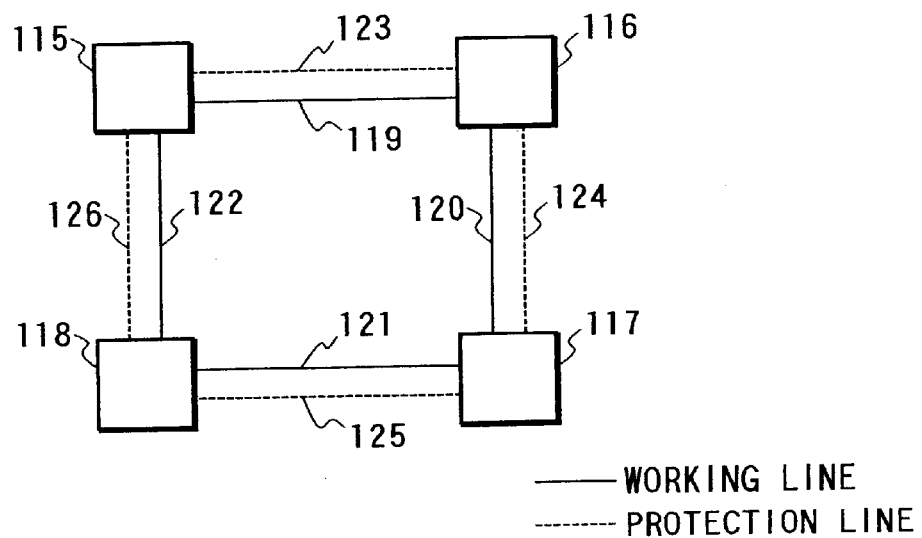
FIG. 10 shows an example of BLSR arrangement.

FIG. 8 shows a flowchart of PT (pass through). As shown in the step S7 of FIG. 5, the APS byte processing circuit performs PT after receiving "PT notification".

Initially, a transmission equipment determines whether or not the received APS bytes indicates "request signal" (S71).

If the received APS bytes indicate request signal, it will be determined whether or not the priority of the "request signal" is the highest (S72). At this point, if the switching is determined not to be performed according to the "status signal" from other transmission equipment, the priority will be considered as to be less than that "status signal". If the priority of the "request signal" is highest, the APS byte processing circuit will transfer the "request signal" as transmitting APS byte without changes to the APS bytes transmitter/receiver of the opposing node (S74).

On contrary, in the step S71 of FIG. 8, if the received APS bytes does not indicate "request signal", it will be determined whether or not there exists other request signals of higher priority (S73).

At this point, if the request signal is determined not to be used for the protection of the failure of that request signal based on the status signals of other failures already protected, the priority of the request signal will be considered as to be less. In every other case, it will be considered as to be higher than that of the status signal. If there exists no "request signal" of higher priority, the "status signal" will be transferred to the APS byte transmitter/receiver of other node as the transmitting APS bytes without changes (S84).

[Protectable Self-healing Network and Other Items]

Figure 11:
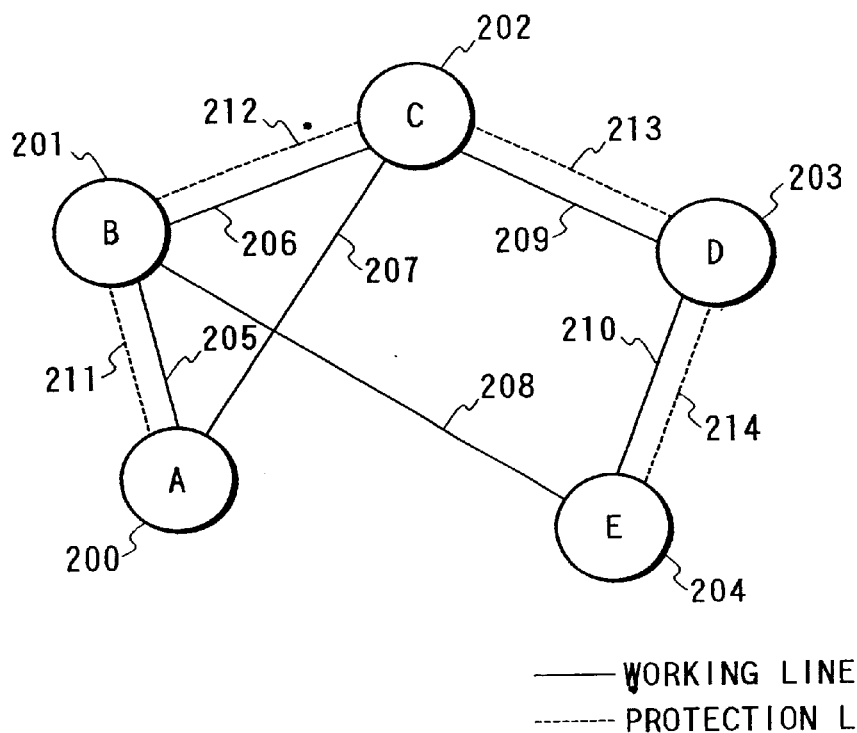
FIG. 11 shows an example of protectable network structure (part one ) according to the present invention.

FIG. 11 shows an example of self-healing network protectable by using APS bytes for all of the switch control information according to the present invention.

The self-healing network as shown in the figure comprises first through fifth transmission equipment 200, 201, 202, 203, and 204, each of these transmission equipment being connected with four protection lines in a single straight chain form, i.e., daisy-chained. Here, the first through fifth transmission equipment are designated as to transmission equipment A, transmission equipment B, transmission equipment C, transmission equipment D, and transmission equipment E. The working lines 205, 206, 209, and 210 are designated as to the working line number 1, and the working lines 207 and 210 to the working line number 2.

Furthermore, the working lines 205 through 210 are connected as shown in the figure, respectively. Each of the transmission equipment is able to switch transmission lines. Also these transmission equipment may transmit signals in both directions in the working lines and protection lines.

In such a network architecture, how switching may be done when a failure occurs will be described below in greater details: (1) the transmission line of the failure, (2) the priority of that transmission line, and (3) the order of occurrence of the failures.

If the first failure of the priority 3 occurs in the working line 206, the working line 206 will be protected by using the protection line 212. Higher the priority larger the value of the priority.

If the second failure of the priority 1 occurs in the working line 209, the working line 209 will be protected by using the protection line 213. The APS bytes is shown in FIG. 3. The APS bytes includes, "SW Priority" indicating the priority, "Channel ID" indicating the number allocated to the working line, "Source ID" indicating the transmission equipment number of the source node, and "Status indication" indicating the information on the switching status of transmission equipment.

As the result of switching method as described above, the "request signal" indicating the protection request of the working line 206 will be transmitted/received on the protection line 212. Also as the result of switching method as described above, "request signal" indicating protection request of the working line 209 will be transmitted/received on the protection line 213. On the protection line 211, "status signal" indicating protection request of the working line 206 will be transmitted from the transmission equipment B. On the protection line 214, "status signal" indicating protection request of the working line 209 will be transmitted from the transmission equipment D. A transmission equipment which receives these signals will update the data stored in the Network Table to a new status.

With these two failures being protected, assuming that another third failure has been occurred on the working line 208 with the priority 2. If the transmission equipment E detected the failure, the transmission equipment E transmits APS bytes indicating "isolated bridge request" as the "request signal" to the transmission equipment D (S42). The transmission equipment D regenerates an "overlapped bridge request" by multiplexing this "isolated bridge request" with the "protection request" of the working line 209 (S65). Here, because the bridge request and the protection request are overlapped, the combination of the priority of these two requests are multiplexed as to one signal in the area SwPriority in the APS bytes. The Channel ID includes the number 2 of the working line indicating bridge request, the. Source Id and Status Indication comprises information of protected status of the working line 209. These are transmitted from the transmission equipment D to the transmission equipment C.

The transmission equipment C will reply "bridge reject" to the transmission equipment D since it cannot obtain the protection line 212 for the third failure (S66). At this point, since the bridge reject for the working line 208 and the protection request for the working line 209 are overlapped, the combination of these two priorities will be multiplexed as to one signal in the area SwPriority of the APS bytes. The Channel ID includes the number 2 of working line indicating overlapped bridge reject, the Source ID and the Status indication includes information on the protection status of the working line 209.

The transmission equipment D notify "bridge reject" to the transmission equipment E by using the APS bytes indicating bridge reject. The transmission equipment E may know thereby that the switching may not be performed (S64).

As a result, the most optimized protection for the network will be performed by rejecting the protection of the third failure without preventing the second failure from being protected.

Figure 12:
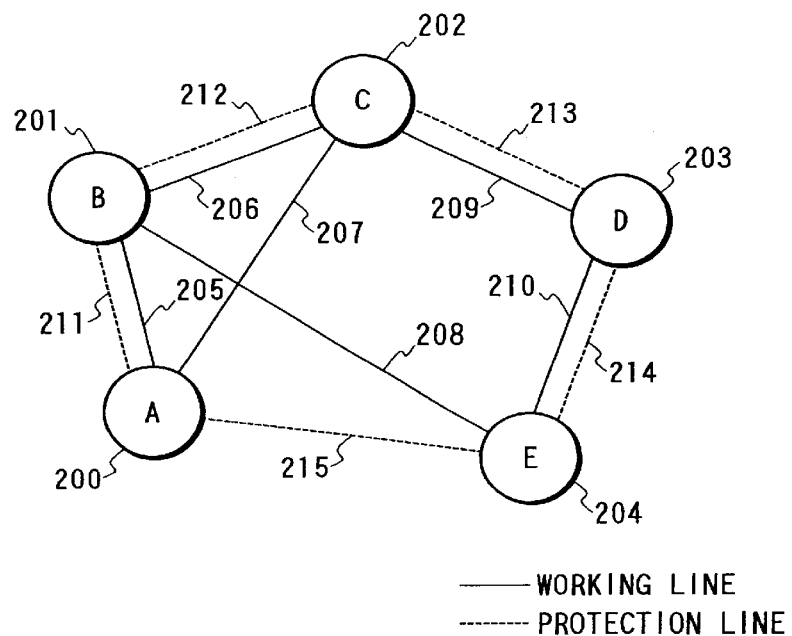
FIG. 12 shows an example of protectable network structure (part two) according to the present invention.

FIG. 12 shows a ring network. In this example protection lines which may self-heal by using APS bytes according to the present invention are connected in a ring form. The self-healing network as shown comprises a first through fifth transmission equipment 200, 201, 202, 204, and 205, each of the transmission equipment being connected with five protection lines in a ring form. Here the first to fifth: transmission equipment 200 to 205 are designated as transmission equipment A, transmission equipment B, transmission equipment C, transmission equipment D, and transmission equipment E, and the working lines 205, 206, 209, and 210 are designated as the working line number 1. and the working lines 207 and 210 as the working line number 2.

Furthermore, the working lines 205 through 210 are connected as shown in the figure, respectively. Each of the transmission equipment is able to switch transmission lines. Also these transmission equipment may transmit signals in both directions in the working lines and protection lines.

In a ring network, there are two ways of selection of protection lines for using for the protection of the failed working lines, i.e., in a clockwise and a counter clockwise direction.

First, as the first setting method of protection lines, the protection lines are preset in the Network Table for the use in case of failure of working lines. For example, in case in which the same failure as that of FIG. 11 occurs, the network may be protectable if the protection lines 211 and 215 are preset. This means that the selection of the protection lines are preset such that the overlap of protection lines becomes less.

As the second setting method of protection lines, the order of priority of the paths of protection lines in the clockwise and counter clockwise directions are preset such that the survivability rate may be increased by attempting switching in the order of the priority of the paths. For example, in case the same failure as that of FIG. 11 occurs, even if the paths of higher priority for the third failure are set to the protection lines 212, 213, and 214, if the transmission equipment E receives a bridge reject, the transmission equipment E will refer to the path information in the Network Table to attempt to perform switching by using protection lines 211 and 215, the path in the second place in the path priority.

Also in the present invention, since status signal is used, a transmission equipment may know switching information in other transmission equipment. For example, assuming that the protection lines 211 and 212 are used for the protection. when a first failure occurs in the working line 207. In such circumstances, when a second failure further occurs in the working line 205, the transmission equipment A receives the status signal of the first failure from the transmission equipment C through the protection lines 213, 214, and 215. Therefore, the transmission equipment A may refer to the paths information in the Network Table to confirm that the protection lines 213, 214, and 215 which are paths of lower priority for the protection of the first failure is available. Then by confirming this, if it determines that two failures of the first and the second may be protected by using these paths, the transmission equipment A will switch the path of the first failure without transmission interruption, to protect by using the protection lines 213. 214, and 215, to protect the second failure by using the protection line 211.

Also in this example, when a failure occurs in a protection line, if a failure of the working line to be used for the protection of that protection line, the protection may be achieved by using other paths that do not include that protection line. For instance, when a failure exists in the protection line 212 and if another failure occurs in the working line 208 which includes that protection line as the path of the first place of the priority, and the transmission equipment E receives a reject, the switching will be attempted by using the protection lines 211 and 215 of the second priority paths by referring to the paths information in the Network Table.

[Example of Signal Sequences in the APS Bytes for the Transmission Line Switching]

Next, the transmission line switching method according to the present invention will be described below in greater details by using the signal sequence of the APS bytes.

The network as shown in FIG. 13 through FIG. 30 comprises the first through seventh transmission equipment 301 to 307, which are connected through protection lines. Here, the first through seventh transmission equipment 301 to 307 are assumed to be transmission equipment A, B, C, D, E, F, and G. respectively, and the working lines 308 and 310 are assumed to be working line number 1, the working line 309 is assumed to be working line number 2. Each of transmission equipment has function of transmission line switching.

Figure 13:
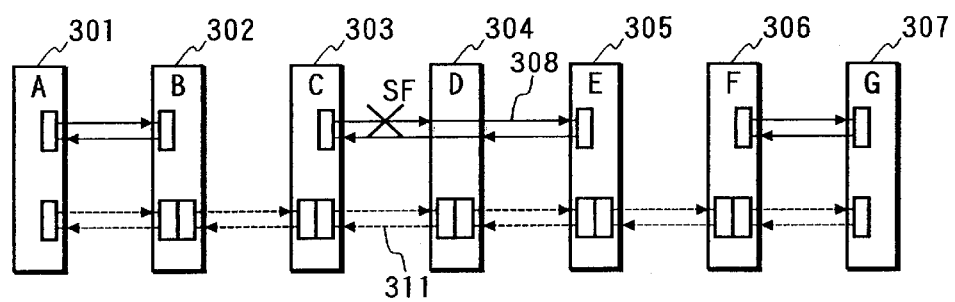
FIG. 13 shows an example of occurrence of an isolated failure in the network.
Figure 14:
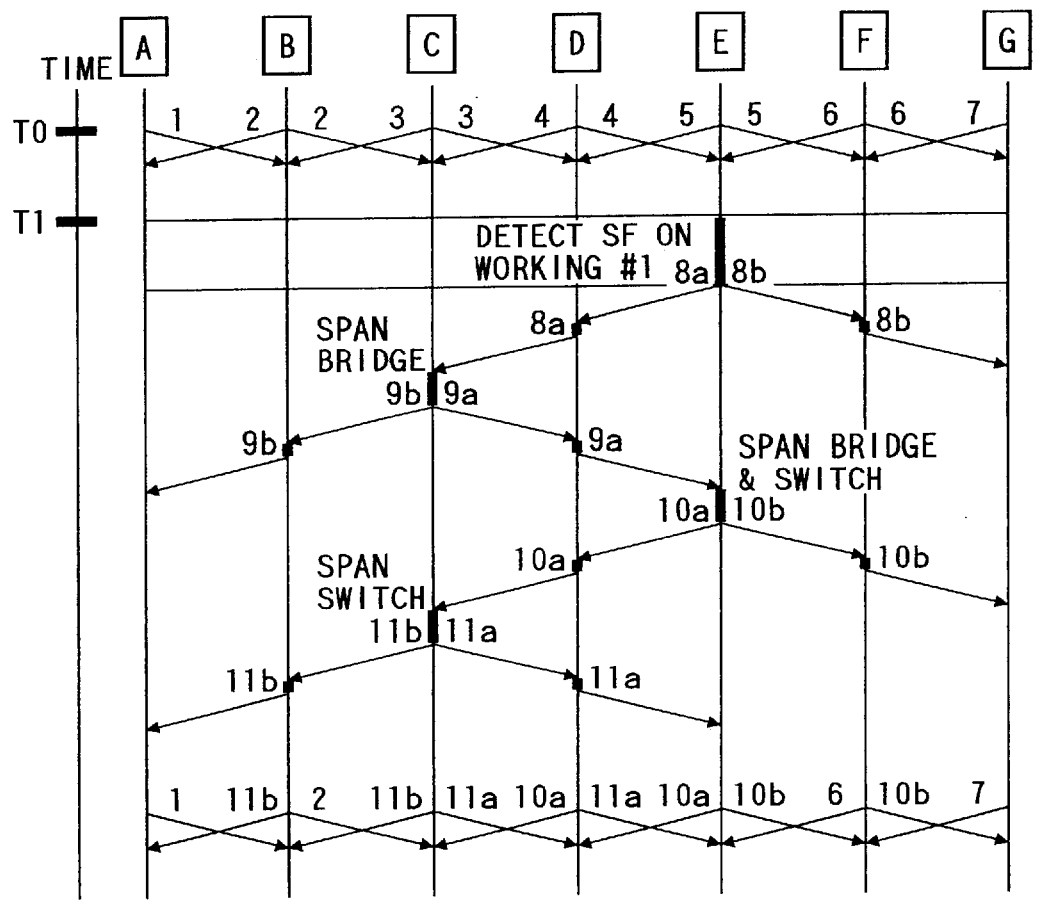
FIG. 14 shows a time chart indicating APS bytes at the time of occurrence of an isolated failure.
Figure 15:
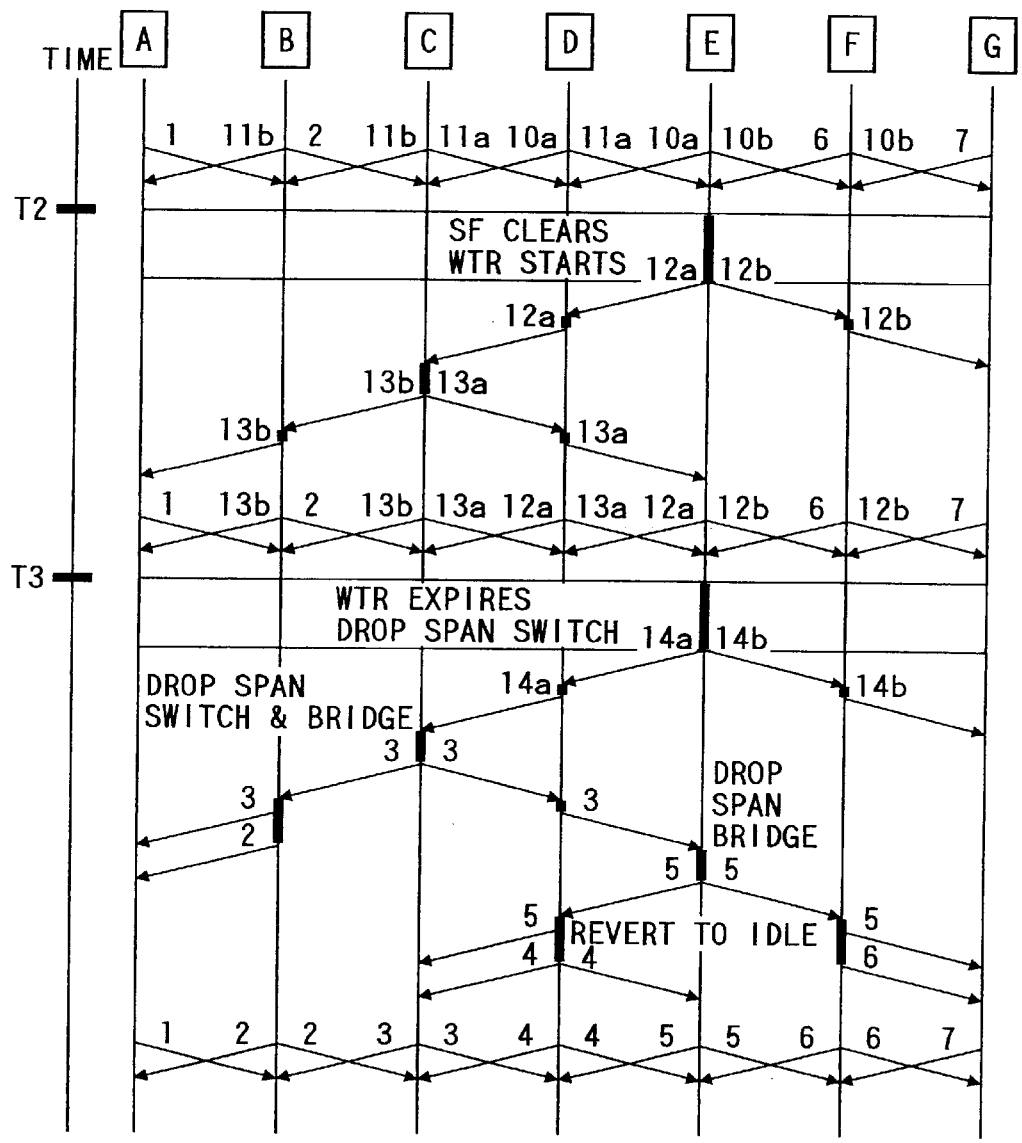
FIG. 15 shows a time chart indicating APS bytes at the time of recovery of an isolated failure.

FIG. 13 shows a diagram of the network illustrating the transmission line switching method according to the present invention when a failure with the priority of SF in the working line 308 occurs. FIG. 14 and 15 are basic time charts of the APS bytes in the network of FIG. 13.

FIG. 14 illustrates the fundamental APS bytes from the occurrence of a failure to the completion of switching. FIG. 15 shows the time chart of the APS bytes when recovered from the switching status.

Referring to FIG. 14, at time T0 no failure has been occurred, indicating the initial status. At time T1 the transmission equipment E detects a failure SF in the working line 1, transmits request signal 8a which is a bridge request to the direction of C, and status signal 8b to the opposite direction. The transmission equipment C, when receiving the bridge request, starts switching, and transmits a request signal 9a which is a bridge response in the direction of E and the status signal 9b to the opposite direction. The transmission equipment E, when receiving a bridge response, completes the switching and transmits a request signal 10a which is protection request in the direction of C, and a status signal 10b which is protection request in the opposite direction. The transmission equipment C, when receiving the protection request, completes the switching, and a request signal 11a which is protection request in the direction of E, and status signal 11b which is protection request in the opposite direction. The transmission equipment receiving request signal or status signal will update the Network Table based on the information in the APS bytes. The transmission equipment A, B, F, and G may know a transmission line switching is being performed between C and E on the working line 1 due to SF, so that a rapid switching decision may be done when a new failure might be occurred.

In FIG. 15, when the failure is cleared at the time T2, WTR signal is transmitted from E, so as to maintain the switching during a predetermined time of period at the status of received response. At the time T3, when the predetermined time of period expires, a switching release signal 14a will be transmitted to release all switchings.

FIG. 16 to FIG. 20 illustrate the transmission line switching method in case of multiple failures where two failures are overlapped not yet switched.

Figure 16:
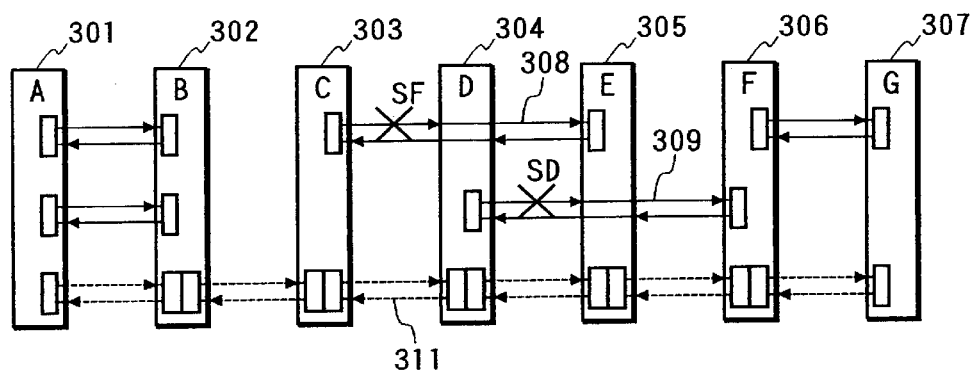
FIG. 16 shows an example of occurrence of multiple failures in the network (part one)
Figure 17:
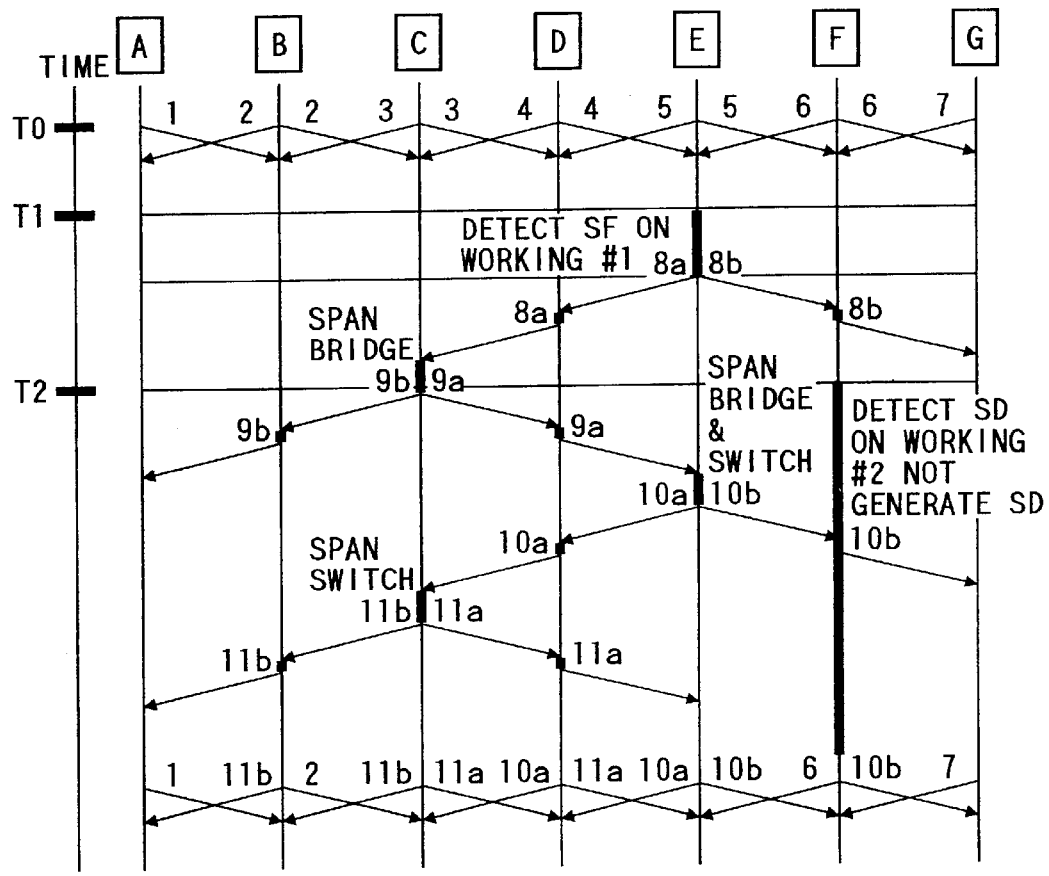
FIG. 17 shows a time chart of APS bytes at the time of occurrence of multiple failures in the network (part one)
Figure 18:
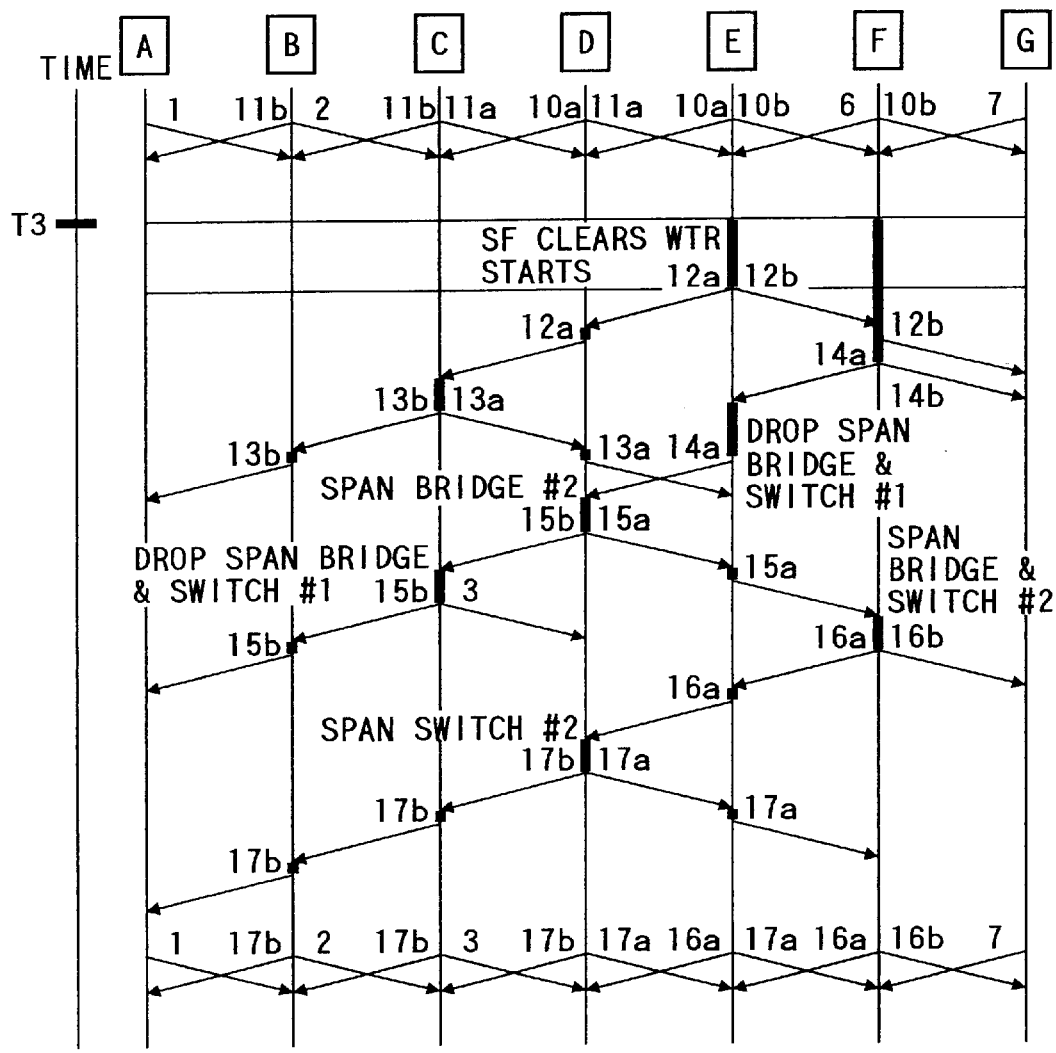
FIG. 18 shows a time chart of APS bytes at the time of recovery of multiple failures in the network (part one)

FIG. 16 is a network diagram (part one), describing the transmission line switching method according to the present invention, in case of the occurrence of multiple failures. FIG. 17 and FIG. 18 are time charts (part one), of the APS bytes of the network shown in FIG. 16, FIG. 17 is a time chart at the time of occurrence of the failure on the working line 309, and FIG. 18 is a time chart at the time of recovery from the failure on the working line 309.

Referring to FIG. 17, the transmission equipment F is shown which recognizes the transmission line switching of the working line 309 with the priority SD because the data in the Network Table is updated by the status signal 8b, not to transmit any APS bytes.

Referring to FIG. 18, the transmission equipment F is shown which recognizes that the failure of the working line 308 is recovered, and protects the working line 309 with the priority SD.

Figure 19:
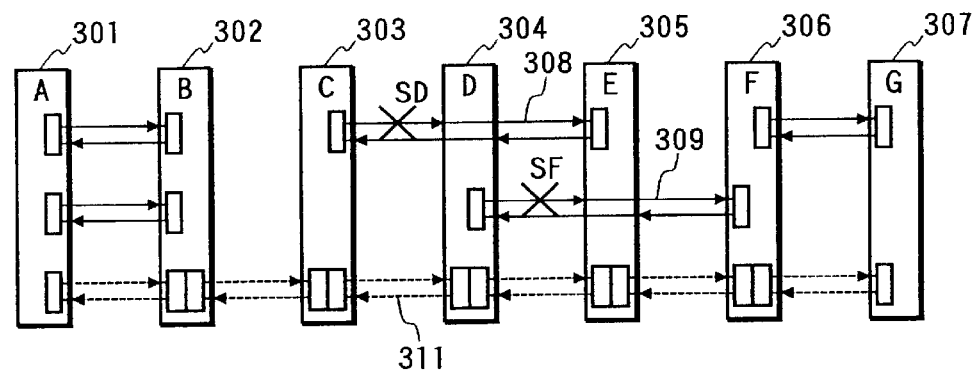
FIG. 19 shows an example of occurrence of multiple failures in the network (part two)
Figure 20:
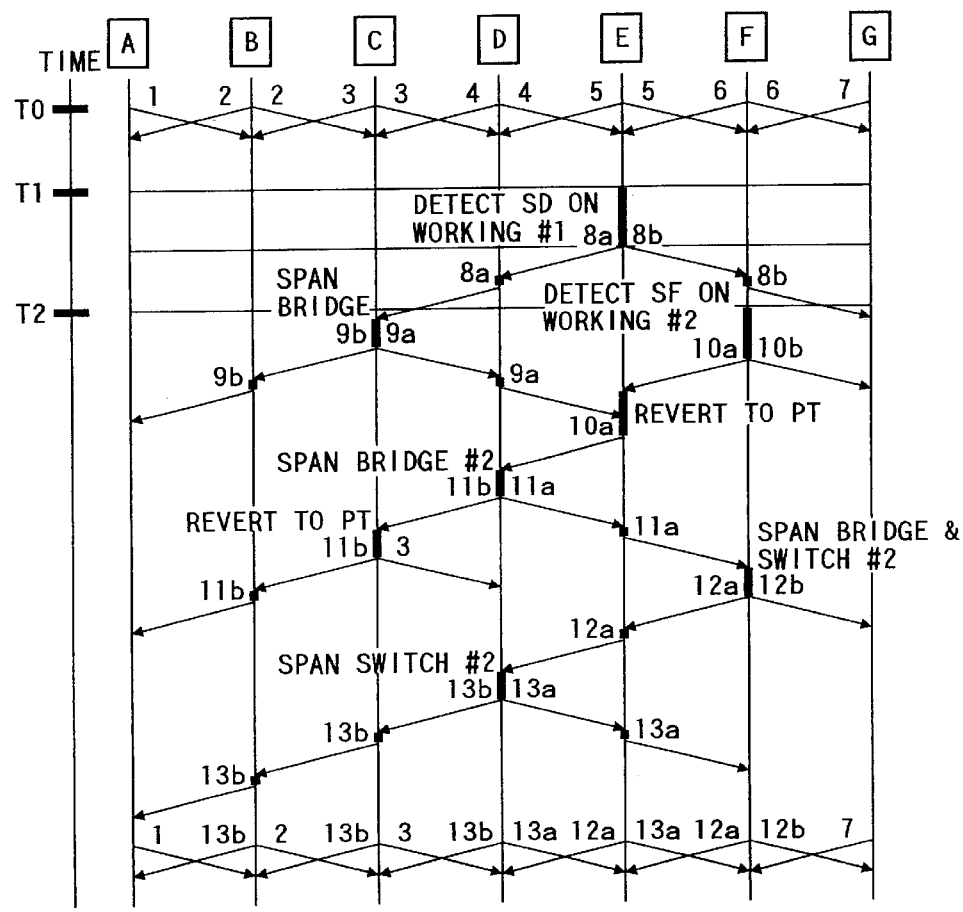
FIG. 20 shows a time chart of APS bytes at the time of occurrence of multiple failures in the network (part two)

Referring to FIG. 19, which depicts a network diagram (part two), describing the transmission line switching method according to the present invention, in case of the occurrence of multiple failures, and referring to FIG. 20, which depicts a time chart (part two), of the APS bytes shown in FIG. 19.

Referring to FIG. 20, which shows switching in which the bridge request of the working line 309 with the priority SF according to the priority determination being preempting for the bridge request of the working line 308 without use of overlapped request when switching in both the transmission equipment is not completed, thereby the working line 309 is protected.

Referring to FIG. 21 through 28, which show network diagrams and time charts of APS bytes in case of multiple failure in which failure is occurred in the working line 309 while the working line 308 is being protected.

In the following examples. the working line having the working line number 308 is being protected.

Figure 21:
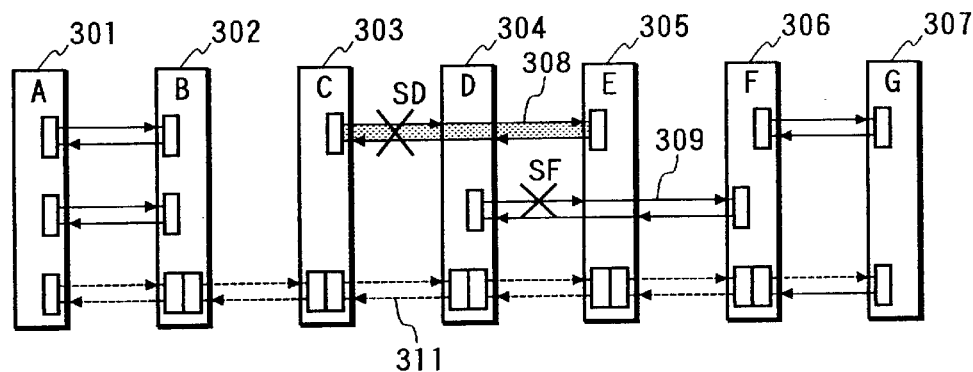
FIG. 21 shows an example of occurrence of multiple failures in the network (part three)
Figure 22:
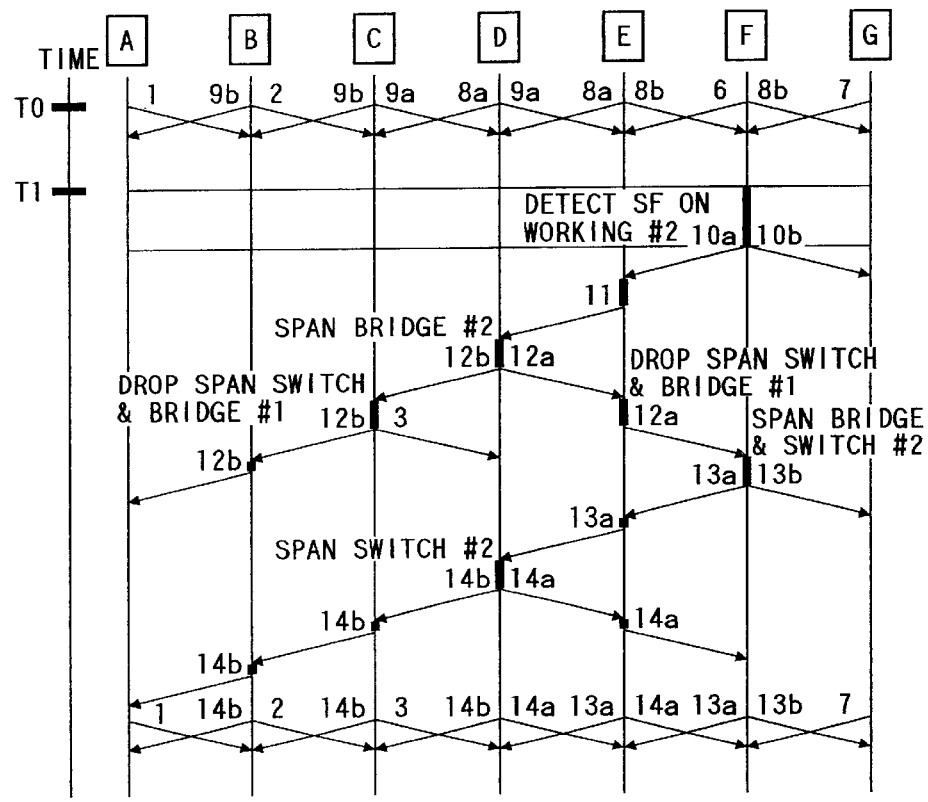
FIG. 22 shows a time chart of APS bytes at the time of occurrence of multiple failures in the network (part three)

Referring to FIG. 21, which shows a network diagram (part three), describing the transmission line switching method according to the present invention in case of occurrence of multiple failures, and referring to FIG. 22, which shows a time chart (part three), of the APS bytes of FIG. 21.

In FIG. 22, a switching is shown performed after verifying whether or not a required protection line is available by using request signal 11 which is an overlapped bridge request between the transmission equipment D and E, in order to attempt the switching of working line 2 with the priority SF. As a result the working line 309 is protected.

Figure 23:
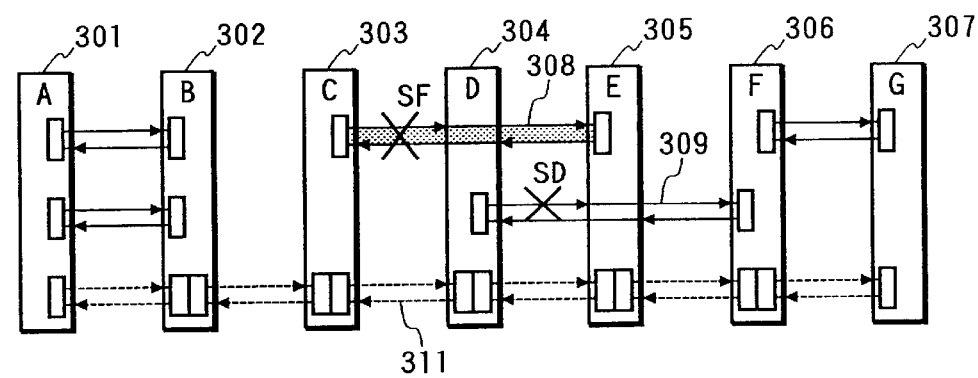
FIG. 23 shows an example of occurrence of multiple failures in the network (part four)

FIG. 23 shows a network diagram (part four), illustrating the transmission line switching method according to the present invention in case of multiple failures. FIG. 24 shows a time chart (part four), of the APS bytes in FIG. 23.

Referring to FIG. 24, the transmission equipment F recognizes the transmission line switching of the working line 309 with the priority SD is not available due to the update of data in the Network Table thereby the APS bytes of the working line 309 are not transmitted.

Figure 25:
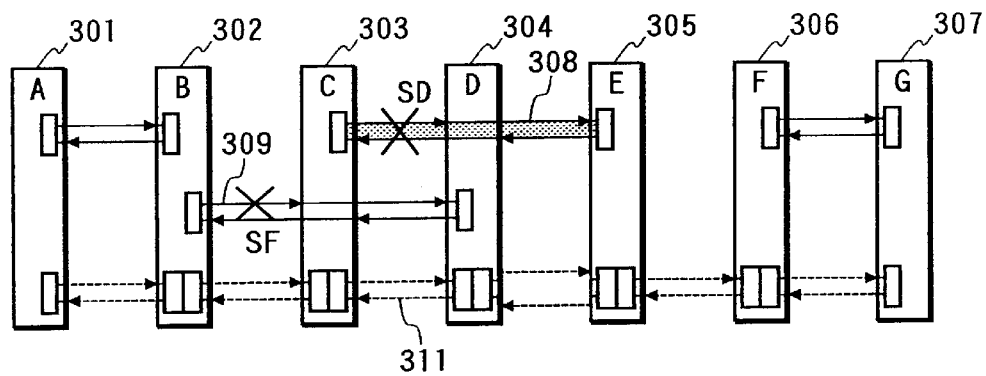
FIG. 25 shows an example of occurrence of multiple failures in the network (part five)
Figure 26:
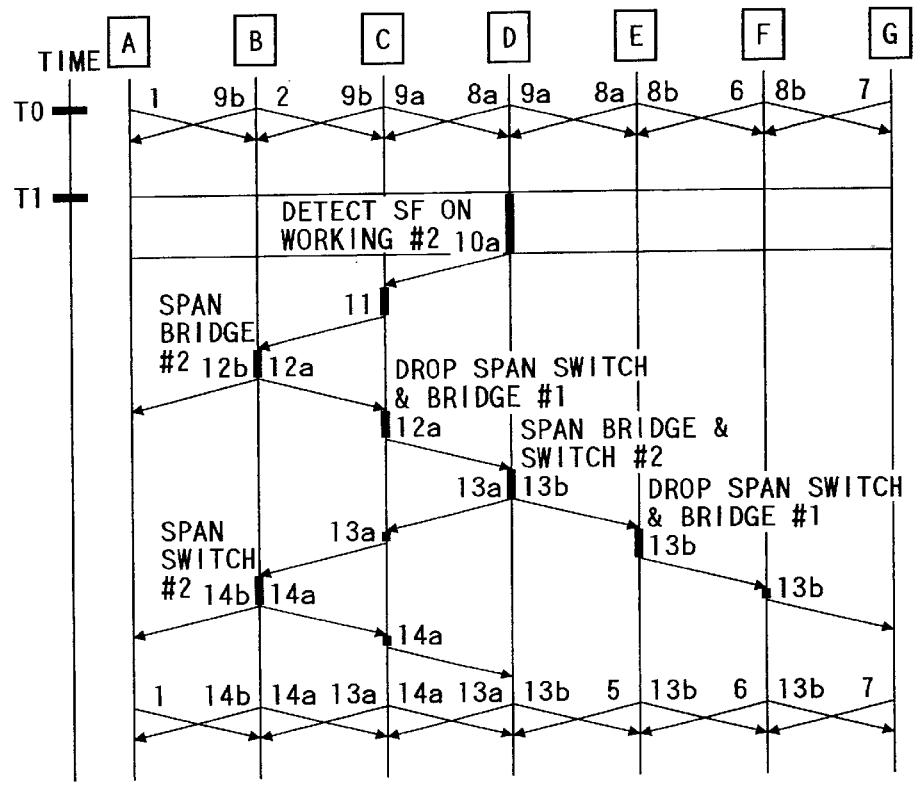
FIG. 26 shows a time chart of APS bytes at the time of occurrence of multiple failures (part five)

FIG. 25 shows a network diagram (part five), illustrating the transmission line switching method according to the present invention in case of multiple failures. FIG. 26 is a time chart of the APS bytes shown in FIG. 25. Referring to FIG. 26, a switching is shown performed by using request signal 10a which is an overlapped bridge request between the transmission equipment C and D, in order to attempt the bridge request of the working line 309 with the priority SF. As a result, the working line 309 is protected.

Figure 27:
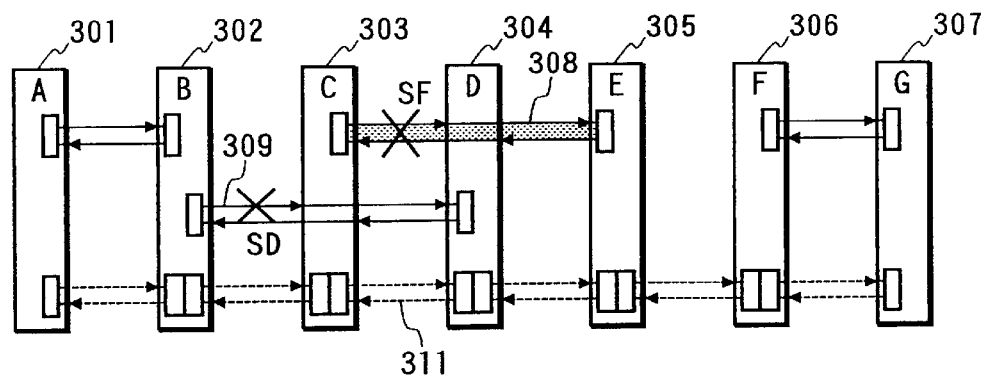
FIG. 27 shows an example of occurrence of multiple failures in the network (part six)
Figure 28:
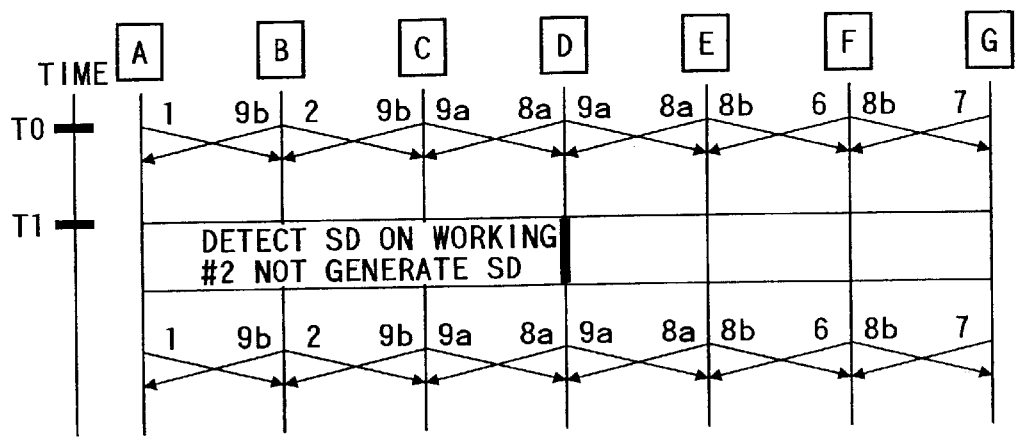
FIG. 28 shows a time chart of APS bytes at the time of occurrence of multiple failures (part six)

FIG. 27 shows a network diagram (part six), illustrating the transmission line switching method according to the present invention in case of multiple failures. FIG. 28 is a time chart (part six), of the APS bytes shown in FIG. 27.

Referring to FIG. 28, APS bytes for the working line 309 with lower priority is shown not transmitted as the result of the priority decision by the transmission equipment D.

Figure 29:
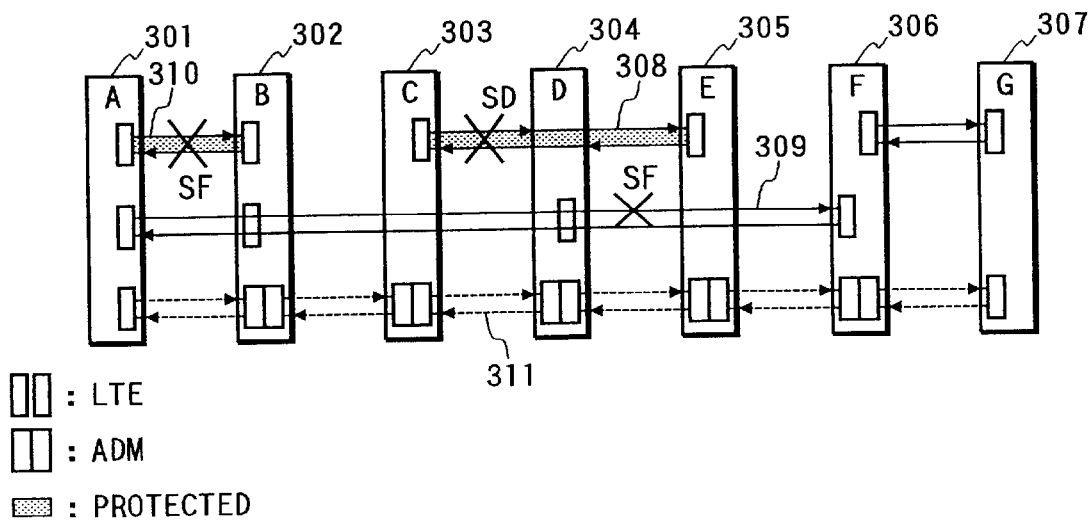
FIG. 29 shows an example of occurrence of multiple failures in the network (part seven)
Figure 30:
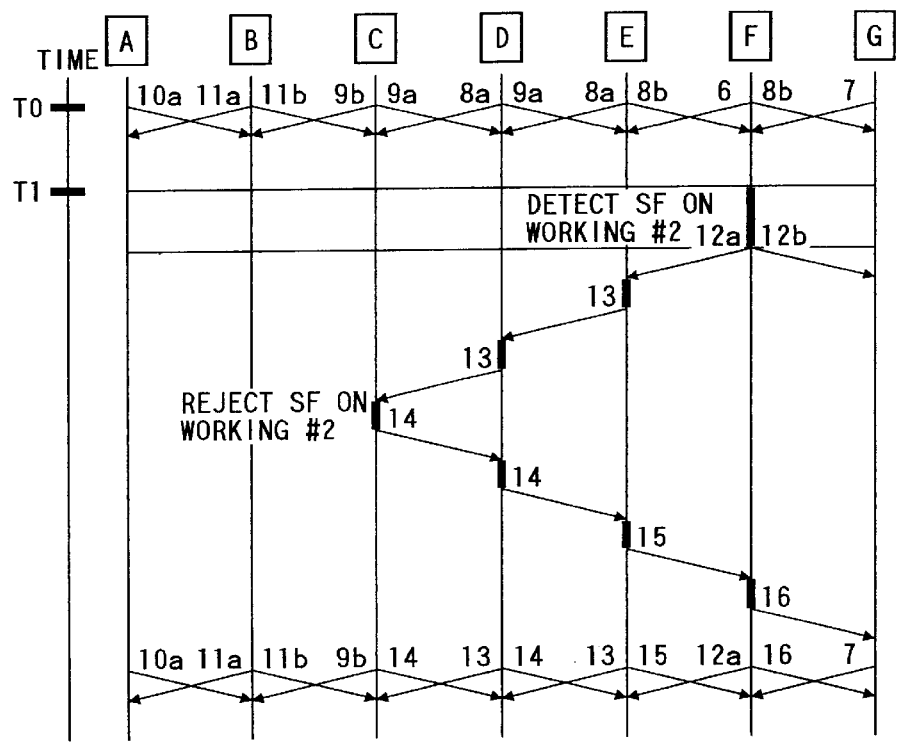
FIG. 30 shows a time chart of APS bytes at the time of occurrence of multiple failures (part seven)

FIG. 29 and FIG. 30 depicts respectively the transmission line switching method in case of a failure with the priority SF in the working line 309, when a failure with the priority SF and a failure with the priority SD are already protected, respectively in the working line 310 and working line 308.

FIG. 29 shows a network diagram (part seven), depicting the transmission line switching method according to the present invention, and FIG. 30 shows a time chart (part seven), of the APS byte shown in FIG. 29.

In order to attempt the bridge request of the working line 309 with the priority SF, the request signal 13 which is an overlapped bridge request is used between the transmission equipment C and E. The transmission equipment C which was notified the failure information with the status signal of the working line 310, rejects this bridge request. The transmission equipment C then uses the request signal 14 which is an overlapped bridge reject to notify to the transmission equipment E that the protection of the working line 309 is not available. The transmission equipment E receiving this request signal uses the status signal 15 which is an overlapped bridge reject to notify to the transmission equipment F that the protection of the working line 309 is not available. It is possible that signals rejected during a predetermined period of time may be withdrawn. As a result, the working line 308 is protected, although lower priority of failure than the working line 309.

As have been described above in accordance with an embodiment, high speed and reliable switching of transmission lines with failures may be allowed. This results from following factors that:

(1) installation of working lines is realized corresponding to the required traffic;

(2) it has advantages that the ratio of working to protection lines is minimized and the economic efficiency and the efficiency of working lines are increased, by sharing protection lines with a plurality of working lines; and (3) furthermore, APS bytes are used for exchanging the switch control information between transmission equipment.

[Rules]

Finally, one example of the rules used in the self-healing network in accordance with the present invention will be described below in greater details. Although all of these rules are not concerning directly to the transmission line switching method of the present invention, these rules are useful for control of transmission itself, for example, in the SONET network or SDH network.

In addition, although needless to say, said [signal sequences in the APS bytes for the transmission line switching] are controlled based on the following rules.

At first, "switch instructions" should be defined. The commands for executing transmission line switching are comprised of "external initiated commands" and "automatic initiated commands". The externally initiated commands are executed for the purpose of maintenance from either its operating system (OS) or workstation (WS) interfaces. The automatically initiated commands are executed monitoring the actual transmission lines by the physically occurred failures.

The "externally initiated commands" are executed by either the OS or WS interfaces to be input to transmission equipment. The processing unit of the transmission equipment initiates that command according to the priority decision. The externally initiated commands may change the switching status, but may not recognize whether it is locally initiated or remotely initiated. Therefore it is not required to define in the APS bytes in case in which these are not needed to be transmitted by the APS bytes. Such commands may be transmitted using section DCC.

Externally initiated commands which are initiated from the OS or WS interfaces to the transmission equipment without using the APS bytes will be described below in greater details.

Clear:

This is an externally initiated command which clears WTR command of a transmission equipment instructed by the command. Following externally initiated commands may be cleared using NR (No Request) code.

When a span between transmission equipment are excessively switched, or when the switching of working lines having data and requiring no transmission line switching is to be prevented, following two commands are effective. As these commands has no timing limitation, they may be transmitted by using the section DCC.

Lockout of Working Channel:

This command inhibits access from specified working lines to the protection lines by disabling the bridge request of transmission equipment. If the working lines already perform switching, it releases switching no matter what the reason of the working lines is. NR request will be transmitted if any other requests are not enabled.

Lockout of Protection—All Spans:

This command inhibits access to all the protection lines. If the working lines perform already switching, it releases switching no matter what the reason of the working lines is. This command is not supported by the APS bytes Thus this command should be transmitted to each of the transmission equipment. It is used at the same level as the lockout of protection request.

Externally initiated commands using APS bytes will be described below in greater details.

Lockout of Protection—Span:

This command inhibits the use of protection lines specified, even if the transmission line switching is enabled. If that protection line is already used by data of a working line the data is switched back to the working line by this command.

Forced Switch—Span:

This command performs switching from a specified working line to a protection line. If neither failure in that protection line nor request of higher priority exists, this command will be performed no matter what the status of the protection line is.

Manual Switch—Span:

This command performs switching from a specified working line to a protection line. This command will be performed if a bit rate lower than SD (signal degrade) in that protection line is detected and a request (including failure in protection lines) with priority equal to or higher than that does not exist.

In the network according to the present invention, exerciser function is indispensable because a plurality of working lines shares protection lines. In order to detect silent failures (i.e., failures which are not automatically detected), the network according to the present invention performs exercise by the APS function.

Exercise—Spans:

This command executes exercise of switching for a specified working line without switching actually. This command may be executed without affecting data on the working line.

"Automatically initiated commands" are executed by monitoring every working lines and protection lines to detect any failures. The processing unit may initiate that command in accordance with the priority logic. The switching method may be these automatically initiated commands as well.

The transmission equipment automatically transmit two kinds of bridge requests, "first bridge request" and "overlap bridge request" and WTR and NR, as described below.

For the first bridge request, there are priorities of Signal Failure-Protection (SF-P), Signal Failure (SF), and Signal Degrade (SD).

For the overlap bridge request, there is priority of Signal Failure on Signal Degrade (SF on SD). These bridge requests are transmitted from a transmission equipment to another.

Next, the sequence flow of the automatically initiated commands will be described below in greater details.

SF request is a-request to be transmitted for the protection of data affected by a heavy failure. Whereas SD request is a request to be transmitted against a less important failure. The request transmits a "bridge request" to a detected request path, and "bridge status" to a status path. A bridge request is a request signal for such as bridge request and protection request. Bridge status is a status signal for such as bridge request and protection request.

Intermediate transmission equipment confirm whether or not that bridge request has been sent to that transmission equipment by referring to the Network Table. If there is another request when the bridge request has not been sent to that transmission equipment, the transmission equipment evaluates the priority to determine to either pass through the bridge request or to reject, for transmitting next signal.

The transmission equipment of the destination will start switching, after receiving a bridge request, if it considers that all of the protection lines are available, and the transmission equipment will reply bridge indication, i.e., response to the bridge request, by means of the status indication. The transmission equipment monitors not only the failures and degradation but also must receive notification of whether or not the switching attempt has been successfully completed. This is because, in the network of the present invention, the transmission equipment detecting a failure cannot determine whether or not to be protected even if the detected priority of the working line is high, which is different from the point-to-point.

When a transmission equipment transmits a bridge request, if the bridge request is overlapped to any other bridge requests and the priority is high, the preempt should be done. However, if there is a transmission equipment already performing switching on the protection line needed for that switching, the request should be passed through while maintaining the switching to determine whether or not the required protection lines are all available.

The overlap bridge request is a bridge request transmitted when another request is passing through the protection line that is already used for switching. In this case the preempt will be started after having the required protection line yielded. If the priority of this bridge request is lower, the request will be rejected and a bridge reject will be replied. The transmission equipment receiving the bridge reject will determine that this bridge request is with the lowest priority. When receiving this signal, transmission will be suppressed during a predetermined period of time until retransmission request signal will be received.

WTR Request:

This command is a request for preventing switching between a working line and a protection line in a manner of oscillation. The WTR request is transmitted when the recovery threshold of the working line is fulfilled. The WTR should be transmitted only after the recovery from a failure of SF or SD, and not after an externally initiated commands. If an SF is cleared and BER fulfills the recovery threshold, a transmission equipment does not input SD condition. In addition, this signal indicates that the priority is the highest during a period of time and becomes retransmission request signal to notify that status to the whole network.

SF is defined as-LOS (Loss of Signal) and LOF (Loss of Frame) in optic signals, line BER that is initiated when degrading below the threshold of a predetermined bit error rate, and other protectable hardware failures.

Signal Failure of Protection (SFP):
a request used when a protection line detects a failure. When a protection line detects a failure, lockout of protection should be asserted On the affected protection line. In this case the APS bytes should use the same code as the lockout of protection.

Signal Failure (SF):
a request that is used when a hardware failure exists on the working line and the protection of other failures on the request path is not performed.

Signal Degrade of Protection (SDP):
a request that is used when a protection line detects signal degradation.

Signal Degrade (SD):
a software failure detected when the threshold of BER is exceeded. This is used for the detection of signal degradation as a bass of repair or maintenance. This request is used when a signal degradation exists on the working line and is overlapped with other protections of failures.

Signal Failure on Signal Degrade (SF on SD):
a request used as an overlap bridge request when a failure is on a working line and SD is protected on the request path.

Reject of Signal Failure on Signal Degrade (R-SF on SD):
a request used as an overlap bridge reject when a failure is on a working line but the switching is rejected because a required protection line is not available, and SD is protected on the request path.

These functional rules may be summarized as follows:

[Summary]

(rule 1) the clear command deletes all externally initiated commands at the specified transmission equipment. The No Request code is used for information exchange of the clear command between transmission equipment.

(rule 2) the clear command clears the WTR status.

(rule 3) the clear command which has to clear all of the externally initiated commands should be received by the transmission equipment which initiated the request from its operating system (OS).

In the Table 1.

Lockout of Protection, Forced Switch, Signal Failure, Signal Failure on Signal Degrade, Manual Switch, Wait to Restore, Exercise, and No Request are shown allocated.

TABLE 1

| B1 | B2 | B3 | B4 |  | B5 | B6 | B7 | B8 |  |
|---|---|---|---|---|---|---|---|---|---|
| 1 | 1 | 1 | 1 | Lockout of Protection | 1 | 1 | 1 | 1 | Extra Traffic |
| 1 | 1 | 1 | 0 | Forced Switch | 1 | 1 | 1 | 0 | Working Channel # 14 |
| 1 | 1 | 0 | 1 | FS on SD | 1 | 1 | 0 | 1 | Working Channel # 13 |
| 1 | 1 | 0 | 0 | Signal Failure | 1 | 1 | 0 | 0 | Working Channel # 12 |
| 1 | 0 | 1 | 1 | SF on SD | 1 | 0 | 1 | 1 | Working Channel # 11 |
| 1 | 0 | 1 | 0 | Signal Degrade | 1 | 0 | 1 | 0 | Working Channel # 10 |
| 1 | 0 | 0 | 1 | Reject SF on SD | 1 | 0 | 0 | 1 | Working Channel # 9 |
| 1 | 0 | 0 | 0 | Manual Switch | 1 | 0 | 0 | 0 | Working Channel # 8 |
| 0 | 1 | 1 | 1 |  | 0 | 1 | 1 | 1 | Working Channel # 7 |
| 0 | 1 | 1 | 0 | WTR | 0 | 1 | 1 | 0 | Working Channel # 6 |
| 0 | 1 | 0 | 1 |  | 0 | 1 | 0 | 1 | Working Channel # 5 |
| 0 | 1 | 0 | 0 | Exercise | 0 | 1 | 0 | 0 | Working Channel # 4 |
| 0 | 0 | 1 | 1 |  | 0 | 0 | 1 | 1 | Working Channel # 3 |
| 0 | 0 | 1 | 0 |  | 0 | 0 | 1 | 0 | Working Channel # 2 |
| 0 | 0 | 0 | 1 |  | 0 | 0 | 0 | 1 | Working Channel # 1 |
| 0 | 0 | 0 | 0 | No Request | 0 | 0 | 0 | 0 | Null Channel |

[Execution Rules of K1 Byte and K2 Byte]

The execution rules of K1byte and K2 byte which are included in an APS bytes will be described below in greater details. When multiple failures exist, a conflict of the protection lines occurs. In this case the priority indicating the level of importance for allocating a request and the transmission line switching are necessary. In SONET, the K1 and K2 bytes of the STS-1#1 are used for the switching. Four leading bits of K1 are used for indicating the priority of the APS bytes. Bit 4 to bit 8 indicate the working line number with the highest priority among the working lines that may use that protection line. Bit 1 to bit 4 of K2 indicate the number of transmission equipment which transmits current APS bytes. Bit 5 of K1 indicates whether the K1 and K2 bytes are request signal or status signal. Bit 6 to bit 8 of K1 are status information which indicates the switching status of the transmission equipment which generates the APS bytes.

All transmission equipment transmit the APS bytes in the idle status at default. If the APS bytes is for other transmission equipment and there is no request with higher priority, they deliver requests one after another. The transmission equipment of destination will perform switching when receiving, and reply the response signal. If rejected on the path a reject signal will be replied. The transmission equipment which requests will wait the response prior to next operation. If the response is not received within a predetermined period of time, the request will be withdrawn.

The switching of data in the receiver side should be completed after confirmation of the completion of bridging of data in the transmitter side so as to minimize the interruption of data in general. However, if that span is totally disrupted and becomes the crossing K bytes in which a bridge request is received from the destination node, data is already disrupted so that switching will be performed.

The rules of K1 and K2 bytes are as follows:

(rule 4) the network transmission line switching method according to the present invention supports in both directions.

(rule 5) all of the network switching according to the present invention is reversible.

(rule 6) all of the network switching according to the present invention is recovered from the protection lines to only the original working lines.

(rule 7) when SF or SD is cleared by a transmission equipment, the transmission equipment enters into WTR status if occurs none of the reception of bridge request with higher priority, the detection of other failures, or external initiation request, the status will be retained during an appropriate timeout.

(rule 8) bit 1 to 4 of K1 carry the priority of the bridge request according to the priority provided in Table 1 or the priority of the bridge request and that of the protection request.

(rule 9) transmission equipment have function to determine the level of priority for the working lines and the null channel (for detecting the protection lines). The default priority is the lowest.

Table 1 shows in descending order except that the SF request in the protection line has higher priority than the FS.

(rule 10) 5 to 8 bits of K1 carry the number of working lines indicating the priority of bridge request of 1 to 4 bits of K1.

Table 2 shows the allocation of 5 to 8 bits of K1 byte.

TABLE 2

| Bits of 5–8 of K1 | Explanation |
|---|---|
| 0 | Null Channel It is used for the detection of SD and SF of the working lines. "0" is used only with LP. |

TABLE 2-continued

| Bits of 5–8 of K1 | Explanation |
|---|---|
| 1 to 14 | Working channels Each bit form 1 to n is used for 1:n type system. These bits are used for each working line of SD and SF. |
| 15 | Extra traffic control It may be used for 1:n type system. "15" is used only with NR |

(rule 11) the working line number used for the bridge request at the transmission equipment performing switching is always terminated by that transmission equipment. In a working line SF is originated when SF is detected, and SD is originated when SD is detected The K2 is allocated as provided in Table 3.

TABLE 3

| Bits of K2 | EXPLANATION |
|---|---|
| Bit of 1–4 | This bit teaches Site ID transmitting the present switching request. |
| Bit 5 | This bit shows "1" when K-1 bits 1–4 are bridge requests and it shows "0" when K-1 bits 1–4 are bridge status. |
| Bit 6–8 | 111 Line AIS |
| | 110 Line RDI |
| | 101 for future |
| | 100 for future |
| | 011 Bridge & Switched (Br & Sw) |
| | 010 Bridged (Br) |
| | 001 Idle-unidirectional |
| | 000 Idle-Bidirectional |

(rule 12) all switchings are reflected by the upgrade of bit 6 to 8 of the K2 byte.

(rule 13) the transmission equipment will transmit default APS codes as shown in Table 4, until appropriate APS signal transmission corresponding to the current status of the network according to the present invention may be realized.

(rule 14) the transmission equipment will transmit default APS codes until path connection information and the transmission equipment number information will be obtained by the Network Table according to the present invention.

(rule 16) when the processing unit detects a failure and if no transmission failure exists for a line, during diagnosis or exercise, no bridge request will be initiated.

Table 4 shows an example of default APS codes.

TABLE 4

| | | |
|---|---|---|
| K1 [1–4] | = | XXXX (Any Value) |
| K1 [5–8] | = | 0000 |
| K2 [1–4] | = | 0000 |
| K2 [5] | = | X (Any Value) |
| K2 [6–8] | = | XXX (Any Value) |

The request as described above indicates that the failure of the transmission line switching function is different from the transmission line switching according to the present invention. For example, transmission of the number of non-existing working line.

[Three Status of Transmission Equipment]

The APS codes which are inserted into K1 and K2 bytes by a transmission equipment define following three status for the transmission equipment status according to the transmission equipment status: "Idle state", "Switching state", "Pass-through state."

The status of transmission equipment changes by circumstances.

It becomes stable when a series of switching operations terminate. The stable status will be described first.

A. "Idle state":

Table 5 shows the K1 and K2 bytes in the Idle state.

TABLE 5

| K1 [1–4] | = | 0000 (No request code) |
|---|---|---|
| K1 [5–6] | = | 000 (null channel number ID) |
| K2 [1–4] | = | Source Site ID |
| K2 [5] | = | 0 (bridge Status Code) |
| K2 [6–8] | = | 000 (Unidirectional mode) |
|  |  | 001 (Bidirectional mode) |

(rule 16) the transmission equipment is in idle when it detects or generates bridge request or bridge status, or does not do pass-through.

(rule 17) all transmission equipment in idle will terminate K1 and K2 bytes in both directions.

B. "Switching state":

there are four sub-states in the Switching state whether the switching operation is completed or not: Sw#O#O, Sw#O#N, Sw#N#O, Sw#N#M (where N and M are integers not equal to 0), wherein the first working line number indicates the direction of receiving the APS bytes, while the second working line number indicates the direction opposed to the direction of receiving. Table 6 shows various kinds of Sw states.

TABLE 6

| STATUS | CHANNEL NUMBER PROTECTED AT RECEIVING SITE | CHANNEL NUMBER PROTECTED AT OPPOSITE SIDE OF RECEIVING SITE |
|---|---|---|
| Sw#0#0 | 0 | 0 |
| Sw#0#N | 0 | N |
| Sw#N#0 | N | 0 |
| SW#N#M | N | M |

(Where N or M is the integer which cannot be 0)

(rule 19) the transmission equipment which detects, generates, or terminates a first bridge request is in the switching state.

(rule 20) following states exist according to the switching status of the first bridge request:

Common rules in the four sub-status of the Sw state will be described. Table 7 shows the K1 and K2 bytes of the Switching State.

TABLE 7

| K1 [1–4] | = | Request Priority |
|---|---|---|
| K1 [5–8] | = | Request channel number ID |
| K2 [1–4] | = | Source Site ID |
| K2 [5] | = | 1/0 (bridge request or bridge status code) |
| K2 [6–8] | = | Status Code |

(rule 21) the transmission equipment in switching state sources the APS bytes shown in FIG. 19.

B-1. Sw#O#M:

(rule 22) the transmission equipment may detect, generate or terminate the first bridge request (of automatic initiation or external initiation). Also the transmission equipment may terminate the overlap request.

(rule 23) when a transmission equipment receives a bridge request which is not for that transmission equipment it is considered as to be detected in view of direction opposed to the receiving direction.

(rule 24) idle status code or bridged status code is generated.

(rule 25) the switching transmission equipment sources bridged request, bridged status, bridged reject according to following rules.

(1) when a failure is detected in a working line terminated by that transmission equipment, or when a bridge request is detected from another transmission equipment,. the priority is determined. If there exists no request with higher priority in the protection line to protect that working line, the first bridge request may be transmitted.

(2) when the transmission equipment with channel number of bridge request is terminated by that transmission equipment, the transmission equipment in Switching state sources switched & bridged status indication of request in the request path, and bridge status in the status path.

When another bridge request in the status path, bridge status is not transmitted.

(3) when a transmission equipment rejects the bridge request for another transmission equipment, if it is not for that transmission equipment, a bridge reject will be transmitted.

(4) the contents of that bridge request will not be changed until there will be a response to the bridge request originated by that transmission equipment.

(5) when receiving bridge reject during a period of time the transmitting of bridge request on it will be stopped.

B-2 Sw#N#M:

(rule 25') the transmission equipment may detect, originate, or terminate the bridge request which the switching is complete; it may also detect, originate, or terminate the overlap bridge request.

(rule 26) a transmission equipment may consider to have received from the direction opposed to receiving when receiving a bridge request which is not for that transmission equipment.

(rule 27) switched & bridged status indication code is transmitted.

(rule 28) the switching transmission equipment sources the bridged request, bridged status, and bridged reject according to following rules:

(1) when that transmission equipment detects a failure in a span of working line which is terminated by that transmission equipment, or when it detects a bridge request from another transmission equipment, it determines the priority to originate an overlap bridge request. If the detected bridge request is for another transmission equipment, and has lower priority than that of channel N, it will be rejected.

(2) when the transmission equipment of request channel number of the bridge request is terminated by that transmission equipment, the transmission equipment in Switching state may source switched & bridged status indication in the request path, and. bridge status in the status path.

However, if there is another bridge request on the status path, it does not source a bridge status.

(3) if the bridge request for another transmission equipment is rejected and the transmission equipment is not the originating one, then it sources the bridge reject.

(4) until a response to the overlap bridge request originated from that transmission equipment the contents of the overlap bridge request will not be changed.

(5) when receiving bridge reject during a predetermined period of time, transmitting of the bridge request on it will be stopped.

(rule 30) the transmission equipment in Switching state may refer to the request channel number and the information in the network map according to the present invention to identify whether or not the bridge request is terminated.

(rule 30') the switching state transmission equipment receiving default APS code from the request path may not change the signal transmission or the path manipulation until it receives an appropriate APS code.

C. Pass-through State:

(rule 31) if a first bridge request is not terminated, the transmission equipment is in pass-through state.

(rule 32) there are two sub-states in the pass-through state according to the first bridge request.

Table 8 shows various kinds of pass-through states. KPT (K byte pass-through) may have APS bytes pass through, PPT (Protection Pass-through) may have only data in protection lines pass through.

KPT:

TABLE 8

| STATUS | EXPLANATION |
| --- | --- |
| KPT | Only K1 and K2 bytes can be passed. |
| PPT | K1 and K2 bytes can be passed. |

(rule 33) the transmission equipment in this state may have bridge request (of automatic initiation or external initiation), bridge reject, or bridge status pass through.

PPT:

(rule 34) the transmission equipment in this state may have the protection lines of the first bridge request pass through.

(rule 35) the transmission equipment in this state may detect bridge request (of automatic initiation or external initiation)or bridge reject, and overlap bridge request.

(rule 36) the transmission equipment in this state may terminate bridge reject.

The transition rules between three states will be described below in greater details.

[Transition Rules Between Three States]

(rule 37) all transition between three states of transmission equipment may be triggered by the change of input K byte, or the detection of failure K byte, externally initiated commands, and the circumstances of detection of transmission equipment failures.

(rule 38) K bytes are effective only when those identical in successive three frames are received.

(rule 39) the transmission equipment does not change current state unless a trigger from the APS controller is received.

(rule 40) the information contained in the bit 1 to 4 in K1 byte is considered as a bridge request in the following condition:
the bit 1 to 4 of K1 byte is first bridge request and the bit 5 of K2 byte indicates request signal.
the bit 1 to 4 of K1 byte is overlap bridge request and the bit 5 of K2 byte indicates request signal.

(rule 41) the information contained in the bit 1 to 4 in K1 byte is considered as a bridge status in the following condition:
the bit 1 to 4 of K1 byte is first bridge request and the bit 5 of K2 byte indicates status signal.

(rule 42) bridge requests may coexist unless the protection line for them are overlapped to the protection line for other bridge requests.

(rule 43) the bridge request for which the protection line is overlapped with the protection line for another bridge request will become the overlap bridge request if there is a first bridge request that the switching is already completed. It may become a first bridge request or overlap bridge request even if it is a first bridge request at the source transmission equipment, depending on the state of intermediate span.

(rule 44) the overlap bridge request may never be protected but should be always protected after becoming the first bridge request.

(rule 45) the bridge request for which the protection line is overlapped with the protection line of another bridge request may be preempted as a first bridge request from FIG. 13 if both bridge requests are not completed in the switching.

(rule 46) the bridge request may preempt the bridge status irrespective of their respective priority. The bridge status does not preempt the bridge request.

(rule 47) the bride status may preempt the transmitting from a transmission equipment of bridge request with lower priority than that if it is not allowed to coexist.

(rule 48) the switching may be initiated or released by solely the request signal.

(rule 49) for all of the local requests (such as SF, SD condition, local WTR, and external request), a local request with the highest priority is decided from the table of priority. If the priority is the same the one with smaller working line number will be taken precedence over.

(rule 50) WTR will become NR-null channel usually when timed out. The WTR state will not be recovered when preempted.

(rule 51) when the external initiated request are cleared it should be entered into NR-null channel status (but not into WTR status).

A. Transition Between the Idle and Pass-Through States:

(rule 52) if a transmission equipment in idle state receives a bridge request or bridge status not terminated by that transmission equipment from one direction, that transmission equipment will enter into KPT.

(rule 53) if a transmission equipment PPT receives No Request code in bit 1 to 4 of K1 byte and idle indication code in bit 6 to 8 of K2 byte from both directions, that transmission equipment will reenter from KPT into Idle State.

B. Transition Between the Idle and Switching states:

(rule 55) the transition from the Idle state to Sw#O#M will be triggered by one of following conditions:
change of K byte from No Request to bridge request terminated by that transmission equipment.
detection of a failure which may be protected by that transmission equipment.
input of externally initiated commands which are able to perform protection switching to that transmission equipment.

(rule 56) when a transmission equipment with Sw#O#M receives No Request in bit 1 to 4 of K1 byte, null channel in bit 5 to 8 thereof, idle indication code in bit 6 to 8 of K2 byte from both directions, that transmission equipment will be back from Sw#O#M to the idle state. If the condition by the bridge request is cleared, the transmission equipment which inserts a bridge request should release switch and request.

(rule 57) when a transmission equipment in switching state transits into the Idle state, the transition may be in three steps as follows:

(1) the switching transmission equipment generating a request (tail-end) initially releases the switch, and inserts No Request in bit 1 to 4 of K1 byte, and Bridged indication code in bit 6 to 8 of K2 byte.

(2) when receiving No Request and Bridge indication code, the transmission equipment detecting a failure release the bridge and switch to insert idle code in both direction. The release of switch may be received on the request path.

(3) when a transmission equipment detecting a failure receives idle code on the request path, it releases the bridge and inserts idle code in both directions.

(rule 58) the transmission equipment may release the bridge after the period of time of WTR time and originates the release signal for the bridge request and bridge status with SF and SD.

C. Transition Between the Pass-Through and Switching States:

(rule 59) the transmission equipment with Sw#O#M may become KPT if preempted to the bridge request with higher priority and not terminated by that transmission equipment.

(rule 60) the transmission equipment in PT may become Sw#N#M when receiving Bridged code or bridge request for that transmission equipment with higher priority.

(rule 61) the transmission equipment in Sw may become KPT when receiving bridged code or bridge request for another transmission equipment with higher priority.

D. Transition Within Switching States:

(rule 62) the transmission equipment in Sw#N#M may become Sw#O#M when receiving a bridge request with higher priority than the bridge request for a protection line which is overlapped and sent to that transmission equipment, a bridge request with lower priority may be preempted to a bridge request with higher priority.

(rule 63) When Sw#O#M detects a bridge request with higher priority sent to that transmission equipment it may be preempted to that bridge request.

(rule 64) when a transmission equipment receives a response to the bridge request originated from-that transmission equipment the switching states will be upgraded.

(rule 65) if a transmission equipment with Sw#O#M receives switched & bridged indication or bridged indication sent to that transmission equipment, it becomes SW#N#M to complete switching.

(rule 66) if a failed status which affects only one span is cleared by one transmission equipment, that transmission equipment becomes WTR and remains during an appropriate period of time of timeout unless:

a bridge request with higher priority than the WTR is received;

another failure is detected;

externally initiated commands are enabled.

(rule 67) when a transmission equipment which is requested to bridge but does actually detect no failure receives a WTR code, that transmission equipment should transmit WTR immediately thereafter.

E. Transition Within Pass-through States:

(rule 68) when a request release signal is received by a transmission equipment in PPT, that transmission equipment becomes KPT. When switched & bridged indication code is received by a transmission equipment in KPT, that transmission equipment becomes PPT.

What is claimed is :

1. Transmission equipment for a SONET/SDH network comprising:

a connecting unit for a plurality of working lines;

a connecting unit for a plurality of protection lines;

a transmitter/receiver for transmitting and receiving information through a protection line to an adjacent transmission equipment by using Automatic Protection Switching (APS) bytes defined in an overhead of an SONET/SDH frame, said information relating to failure information;

a network table for storing the connection status of said network and said failure information;

a processing unit for determining whether to protect one of a plurality of working lines in which a failure occurred by way of one of a plurality of protection lines based on said information stored in said network table and said information in said APS bytes.

2. The transmission line equipment as claimed in claim 1, further comprising a monitor for monitoring if a failure occurs in one of said working lines, wherein said processing unit determines whether to protect one of said working lines in which a failure occurred by way of one of said protection lines based on said information stored in said network table, said failure information in the APS bytes, and the tracking results of the monitoring by said monitor.

3. The transmission equipment as claimed in claim 1, wherein said failures include signal degradation.

4. The transmission equipment as claimed in claim 1, wherein said failure information in said APS bytes includes, priority information for one of said working lines which is currently protected by one of said protection lines, and priority information for one of said working lines in which a failure has newly occurred;

said priority information being multiplexed on K1 bytes defined in said APS bytes.

5. The transmission equipment as claimed in claim 4, wherein said processing unit determines whether to protect one of said working lines in which a failure has newly occurred by way of one of said the protection lines which protects the currently protected working line, based on said priority information.

* * * * *